US010565616B2

(12) United States Patent
Thompson et al.

(10) Patent No.: US 10,565,616 B2
(45) Date of Patent: Feb. 18, 2020

(54) MULTI-VIEW ADVERTISING SYSTEM AND METHOD

(71) Applicant: Misapplied Sciences, Inc., Redmond, WA (US)

(72) Inventors: David Steven Thompson, Redmond, WA (US); Paul Henry Dietz, Redmond, WA (US); Albert Han Ng, Redmond, WA (US)

(73) Assignee: Misapplied Sciences, Inc., Redmond, WA (US)

( * ) Notice: Subject to any disclaimer, the term of this patent is extended or adjusted under 35 U.S.C. 154(b) by 0 days.

(21) Appl. No.: 15/649,188

(22) Filed: Jul. 13, 2017

(65) Prior Publication Data

US 2019/0019218 A1   Jan. 17, 2019

(51) Int. Cl.
*G06F 9/30* (2018.01)
*H04N 13/368* (2018.01)
(Continued)

(52) U.S. Cl.
CPC .......... *G06Q 30/0255* (2013.01); *G09F 9/30* (2013.01); *G09F 19/14* (2013.01); *H04N 13/351* (2018.05);
(Continued)

(58) Field of Classification Search
CPC .......................... G06Q 30/0255; H04N 13/368
(Continued)

(56) References Cited

U.S. PATENT DOCUMENTS 5,855,425 A   1/1999  Hamagishi
5,949,581 A   9/1999  Kurtenbach et al.
(Continued)

FOREIGN PATENT DOCUMENTS

EP   2 685 735 A1   1/2014
WO   02/24470 A1   3/2002
(Continued)

OTHER PUBLICATIONS

International Search Report, dated Jun. 3, 2016, for International Application No. PCT/US2016/014122, 3 pages.
(Continued)

*Primary Examiner* — Joseph G Ustaris
*Assistant Examiner* — Amir Shahnami
(74) *Attorney, Agent, or Firm* — Seed IP Law Group LLP

(57) ABSTRACT

A multi-view (MV) advertising system includes an MV display including one or more MV pixels, each configured to emit beamlets in different directions in a beamlet coordinate system. The MV advertising system receives, via an input node, a first attribute of a first viewer or of a first viewing zone and, optionally, a second attribute of a second viewer or of a second viewing zone. The MV advertising system controller defines the first and second viewing zones relative to the MV display in a viewing zone coordinate system, determines a mapping that translates between the viewing zone coordinate system and the beamlet coordinate system, associates first and second targeted advertising contents with the first and second viewing zones based at least on the first and second attributes, and controls the MV display to project first and second images generated from the first and second targeted advertising contents to the first and second viewers at the first and second viewing zones, respectively.

29 Claims, 8 Drawing Sheets

(51) Int. Cl.
*G06Q 30/02* (2012.01)
*G09F 19/14* (2006.01)
*G09F 9/30* (2006.01)
*H04N 13/351* (2018.01)
*H04N 13/398* (2018.01)

(52) U.S. Cl.
CPC ......... *H04N 13/368* (2018.05); *H04N 13/398* (2018.05)

(58) Field of Classification Search
USPC .......................................................... 348/51
See application file for complete search history.

(56) References Cited

U.S. PATENT DOCUMENTS

| | | |
|---|---|---|
| 6,339,421 B1 | 1/2002 | Puckeridge |
| 6,377,295 B1 | 4/2002 | Woodgate et al. |
| 7,001,023 B2 | 2/2006 | Lee et al. |
| 7,462,104 B2 | 12/2008 | De Cesare |
| 7,602,395 B1 | 10/2009 | Diard |
| 7,990,498 B2 | 8/2011 | Hong |
| 8,461,995 B1 | 6/2013 | Thornton |
| 9,080,279 B2 | 7/2015 | Jun et al. |
| 9,396,588 B1 | 7/2016 | Li |
| 9,715,827 B2 | 7/2017 | Ng et al. |
| 9,743,500 B2 | 8/2017 | Dietz et al. |
| 9,792,712 B2 | 10/2017 | Ng et al. |
| 2003/0065805 A1* | 4/2003 | Barnes, Jr. ............. G06Q 10/02 709/231 |
| 2003/0115096 A1 | 6/2003 | Reynolds et al. |
| 2003/0156260 A1 | 8/2003 | Putilin et al. |
| 2004/0252374 A1 | 12/2004 | Saishu et al. |
| 2005/0093986 A1 | 5/2005 | Shinohara et al. |
| 2005/0195330 A1 | 9/2005 | Zacks et al. |
| 2009/0109126 A1 | 4/2009 | Stevenson et al. |
| 2009/0273486 A1 | 11/2009 | Sitbon |
| 2010/0002079 A1* | 1/2010 | Krijn .................. G02B 27/0093 348/148 |
| 2010/0085517 A1 | 4/2010 | Hong |
| 2010/0207961 A1 | 8/2010 | Zomet |
| 2010/0214537 A1 | 8/2010 | Thomas |
| 2010/0246018 A1 | 9/2010 | Yu |
| 2011/0159929 A1* | 6/2011 | Karaoguz .......... H04N 21/4312 455/566 |
| 2011/0169863 A1 | 7/2011 | Kawai |
| 2011/0216171 A1 | 9/2011 | Barre et al. |
| 2011/0242298 A1 | 10/2011 | Bathiche et al. |
| 2011/0304613 A1 | 12/2011 | Thoresson |
| 2012/0026157 A1* | 2/2012 | Unkel .................... G09G 3/003 345/419 |
| 2012/0062565 A1 | 3/2012 | Fuchs et al. |
| 2012/0105445 A1 | 5/2012 | Sakai et al. |
| 2012/0114019 A1 | 5/2012 | Wallace et al. |
| 2012/0140048 A1 | 6/2012 | Levine |
| 2012/0218253 A1* | 8/2012 | Clavin ............... G02B 27/0093 345/419 |
| 2012/0268451 A1 | 10/2012 | Tsai et al. |
| 2012/0300711 A1 | 11/2012 | Wang et al. |
| 2013/0013412 A1* | 1/2013 | Altman .................. G09F 21/04 705/14.61 |
| 2013/0093752 A1 | 4/2013 | Yuan |
| 2013/0169765 A1 | 7/2013 | Park et al. |
| 2013/0182083 A1* | 7/2013 | Grossmann .......... H04N 13/327 348/51 |
| 2013/0282452 A1* | 10/2013 | He ....................... G06Q 30/02 705/14.7 |
| 2013/0298173 A1 | 11/2013 | Couleaud et al. |
| 2014/0015829 A1 | 1/2014 | Park et al. |
| 2014/0035877 A1 | 2/2014 | Cai et al. |
| 2014/0061531 A1 | 3/2014 | Faur et al. |
| 2014/0111101 A1 | 4/2014 | McRae |
| 2014/0300711 A1 | 10/2014 | Kroon et al. |
| 2014/0313408 A1 | 10/2014 | Sharma et al. |
| 2014/0316543 A1 | 10/2014 | Sharma et al. |
| 2015/0020135 A1 | 1/2015 | Frusina et al. |
| 2015/0042771 A1 | 2/2015 | Jensen et al. |
| 2015/0049176 A1 | 2/2015 | Hinnen et al. |
| 2015/0062314 A1* | 3/2015 | Itoh ........................ G06F 3/012 348/55 |
| 2015/0085091 A1 | 3/2015 | Varekamp |
| 2015/0092026 A1 | 4/2015 | Baik et al. |
| 2015/0198940 A1 | 7/2015 | Hwang et al. |
| 2015/0229894 A1 | 8/2015 | Dietz |
| 2015/0279321 A1 | 10/2015 | Falconer et al. |
| 2015/0293365 A1 | 10/2015 | Van Putten et al. |
| 2015/0334807 A1 | 11/2015 | Gordin et al. |
| 2015/0356912 A1 | 12/2015 | Dietz |
| 2016/0012726 A1 | 1/2016 | Wang |
| 2016/0210100 A1 | 7/2016 | Ng et al. |
| 2016/0212417 A1 | 7/2016 | Ng et al. |
| 2016/0224122 A1 | 8/2016 | Dietz et al. |
| 2016/0227201 A1 | 8/2016 | Ng et al. |
| 2016/0261837 A1 | 9/2016 | Thompson et al. |
| 2016/0261856 A1 | 9/2016 | Ng et al. |
| 2016/0293003 A1 | 10/2016 | Ng et al. |
| 2016/0341375 A1 | 11/2016 | Baker |
| 2016/0341377 A1 | 11/2016 | Eddins |
| 2016/0364087 A1 | 12/2016 | Thompson et al. |
| 2016/0366749 A1 | 12/2016 | Dietz et al. |
| 2016/0371866 A1 | 12/2016 | Ng et al. |
| 2017/0155891 A1 | 6/2017 | Hu et al. |
| 2017/0205889 A1 | 7/2017 | Ng et al. |
| 2018/0115772 A1 | 4/2018 | Thompson et al. |
| 2018/0277032 A1 | 9/2018 | Ng et al. |
| 2018/0357981 A1 | 12/2018 | Ng et al. |
| 2019/0015747 A1 | 1/2019 | Thompson et al. |
| 2019/0028696 A1 | 1/2019 | Dietz et al. |

FOREIGN PATENT DOCUMENTS

| | | |
|---|---|---|
| WO | 2013/183108 A1 | 12/2013 |
| WO | 2016/118622 A1 | 7/2016 |
| WO | 2016/141248 A1 | 9/2016 |

OTHER PUBLICATIONS

International Search Report, dated May 12, 2016, for International Application No. PCT/US2016/020784, 4 pages.
International Search Report, dated Sep. 29, 2016, for International Application No. PCT/US2016/037185, 4 pages.
U.S. Appl. No. 15/469,220, filed Mar. 24, 2017, Display System and Method for Delivering Multi-View Content.
U.S. Appl. No. 15/648,128, filed Jul. 12, 2017, Multi-View Display Systems for Quest Experiences, Challenges, Scavenger Hunts, Treasure Hunts, & Alternate Reality Games.
U.S. Appl. No. 15/809,147, filed Nov. 10, 2017, Precision Multi-View Display.
U.S. Appl. No. 15/934,068, filed Mar. 23, 2018, Personalized Audio-Visual System.
International Search Report, dated Feb. 25, 2019, for International Application No. PCT/US2018/059859, 14 pages.
International Search Report, dated Jun. 21, 2018, for International Application No. PCT/US2018/024024, 3 pages.

* cited by examiner

MULTI-VIEW ADVERTISING SYSTEM AND METHOD

BACKGROUND

Technical Field

This disclosure relates to a multi-view (MV) advertising system and method, which utilize a multi-view (MV) display capable of forming multiple images respectively visible to multiple viewers located in multiple viewing zones relative to the MV display (hence a different image shown to a different viewer) independently of each other and simultaneously.

Description of the Related Art

Advertising is used by companies to influence others to buy or use their products and services. In the 20th century, broadcasting technologies allowed the same ads to be delivered to many people simultaneously. For products and services with broad appeal, this seemed efficient. But when products have limited appeal, this is not the case. For example, men typically have little use for feminine hygiene products. To sell these products more efficiently, an advertiser might choose to purchase ad time during a television show that had mostly female viewers. By the late 20th century, media outlets were creating detailed demographic profiles of their consumers so that advertisers could select among them to reach ever more specific audiences.

The 21st century saw the rise of personal devices such as personal computers, tablets and smartphones. For the first time, technology made it possible to target ads to people with particular characteristics on a massive scale. For example, if you want to target sneaker ads to people who are looking for sneakers, you can buy ads that will display when someone does an online search for sneakers. Targeted advertising is not only effective, it is also very lucrative, and it has driven the financial performance of some of the world's most successful companies.

Targeted advertising works well online. Through tracking cookies and other technical means, it is possible to learn a very great deal of personal information, and this is routinely used to select the most effective ads.

Targeted ads are much harder to do in physical stores. In order to reach individual consumers, some companies are pushing advertisements to users' cell phones when they are in proximity of the point of purchase. Because these are personal devices, schemes like this can only work if the user is voluntarily running a special application on his or her device. Systems like these can quickly become annoying. If your personal device is buzzing every few steps to push you an ad, most people will simply disable the offending application.

In sharp contrast, point of purchase advertising via signage in the environment is an expected and often desirable part of the shopping experience. Signs explain the benefits of particular products, and help consumers determine what fits their needs. However, the benefits of targeting are largely unavailable. For example, a customer with a food allergy may wish that point of purchase displays made special note of which products did or did not contain their specific allergens. Providing such targeted information, tailored specifically to each individual customer, is impractical given the limited space available on point of purchase displays. It may be possible, for example, to provide sensors that observe a shopper pick up a certain product, and consequently trigger an advertising presentation on a nearby monitor that promotes the very product. Problems with this approach may include that everyone in the vicinity is exposed to the presentation intended for the one shopper, and that only one shopper can receive the targeted message at a time (i.e., others can't receive their own targeted messages, simultaneously). Stores are often crowded places, and conventional signage, even in combination with sensors, does not provide a mechanism for targeting different information to different customers that are within view of the same signage.

BRIEF SUMMARY

Various embodiments of the disclosure are directed to a system and method of providing targeted advertisements to different customers in public spaces via shared, multi-view (MV) displays. The disclosure incorporates a MV display which is capable of simultaneously displaying different content when viewed from different locations.

Briefly, an MV display includes one or more multi-view (MV) pixels, wherein each MV pixel is configured to emit beamlets (individually controllable beams) in different directions in a beamlet coordinate system. Some details of the MV display are disclosed in co-assigned and co-pending U.S. patent application Ser. No. 15/469,220, titled "DISPLAY SYSTEM AND METHOD FOR DELIVERING MULTI-VIEW CONTENT", which is incorporated by reference herein. A system controller coupled to the MV display defines (e.g., based on an input from a sensing system) multiple viewing zones located relative to the MV display in a viewing zone coordinate system. The system controller determines a mapping that translates between the viewing zone coordinate system (where the multiple viewing zones are located) and the beamlet coordinate system (where the MV-pixel beamlets are emitted in different directions).

In various embodiments, the system controller receives, via an input node, a first attribute of a first viewer (e.g., a first shopper) or of a first viewing zone (e.g., where the first shopper is standing) and a second attribute of a second viewer or of a second viewing zone. The system controller associates first and second targeted advertising contents with the first and second viewing zones, respectively, based at least on the first and second attributes. The first and second attributes may be any characteristics associated with, or indicative of, the viewer or the viewing zone, such as the presence or location of the viewer, the viewer's purchase history or path of travel in the store, the location of the viewing zone, some spatial or environmental condition of the viewing zone (e.g., the proximity of a store that relates to the targeted advertisement), to name a few.

For each of first and second images generated from the first and second targeted advertising contents, the system controller, using the mapping between the viewing zone coordinate system and the beamlet coordinate system, identifies a bundle of beamlets from the MV pixels of the MV display directed to the first or second viewing zone to form the first or second image. The bundle of beamlets directed to the first viewing zone to form the first image visible to the first viewer is different from the bundle of beamlets directed to the second viewing zone to form the second image visible to the second viewer. Thus, the MV advertising system and method according to various embodiments are capable of presenting targeted advertisements to multiple viewers/shoppers within view of a single MV display independently of each other, simultaneously, to make targeted advertising possible in a physical store setting.

In further embodiments, the MV advertising system may be used to provide targeted advertising to a single viewer while keeping others (e.g., other shoppers) around him oblivious to the targeted advertising shown only to the single viewer standing in his viewing zone. According to such embodiments, the input node of the MV advertising system, in operation, receives a first attribute of a first viewer or of a first viewing zone. The system controller defines the first viewing zone located relative to the MV display in a viewing zone coordinate system, determines a mapping that translates between the viewing zone coordinate system and the beamlet coordinate system, and associates a first targeted advertising content with the first viewing zone based at least on the first attribute. The system controller, for a first image generated from the first targeted advertising content, using the mapping, identifies a bundle of beamlets from the one or more MV pixels of the MV display directed to the first viewing zone to form the first image. The system controller outputs control signaling for the MV pixels, wherein the control signaling defines color and brightness of each of the beamlets in the bundle to project the first image to the first viewing zone.

In some embodiments, the first and second viewing zones are set up (configured) for the MV display, such that any viewer that enters the first viewing zone will see the first image generated from the first targeted advertising content and any viewer that enters the second viewing zone will see the second image generated from the second targeted advertising content.

In other embodiments, the MV advertising system includes a sensing system that provides real-time information on, for example, the location of viewers as they move around and hence the location of viewing zones in association with the location of viewers. The sensing system may additionally provide information regarding the viewers' identity, behavior, observable demographics, or other characteristics, which may be used by the system controller as the first and second attributes to select the right targeted advertising content. The system controller may also draw on data (the first and second attributes) that is available from other sources, including preference information for the particular customer, prior purchase history, or any other relevant data, retrievable from storage devices, from networks, etc. In this way, the system controller may determine and provide the targeted advertising content that is tailored or customized for each of multiple viewers within range of the MV display.

In further embodiments, the MV advertising system selects the targeted advertising content for each viewer based not only on the single viewer and his or her characteristics, but also on other viewers and their characteristics within range of the MV display. For example, the sensing system may provide the identities of viewers within range, and using other data, recognize relationships such as a husband and a wife shopping together. In a group shopping situation, purchase decisions are often arrived at collectively, and the advertising may be adjusted to optimize for this situation. A husband and wife might be shown different information to help them make a collective decision to purchase the product. In a further example, a store may have a series of products on display, and there may be a case that one particular product would be best advertised to each individual of the group. However, there may be constraints, such as lack of display space, for all current customers to examine the product simultaneously. In this case, it may be preferred to direct some customers to less optimal products rather than losing the sale altogether, so as to create the highest value for the group overall. Various embodiments of the MV advertising system and method allow for this sort of group optimization.

In some embodiments, the targeted advertising contents to be directed at multiple viewers are determined through a market process. For example, the market process may consist of an auction, in which prospective advertisers may bid on the right to display their chosen advertisement to a viewer with certain attributes. For example, a prospective advertiser may place a bid to show an ad for their gluten-free product to a customer, who is known or otherwise determined to prefer gluten-free products and is within range of the MV display. Similarly, a different prospective advertiser may choose to place a bid to show an ad to a customer who prefers all natural products. These bids are entered via a marketplace. The marketplace may present possible advertising scenarios (e.g., as a combination of attributes) to potential ad buyers, and allow them to bid for or otherwise purchase or obtain those advertising scenarios. For example, instead of an auction, various combinations of attributes may be put on a market in the form of a pricing menu published to prospective advertisers. The marketplace may operate in a pre-ordered fashion, for example, where bids are placed in anticipation of a particular scenario as exemplified above (e.g., the presence of a customer known to prefer gluten-free products or natural products). Alternatively, the marketplace may operate in real-time—presenting a current advertising opportunity with particular attributes to solicit immediate bids or offers of purchase, which are quickly evaluated to determine the advertising content which is shown moments later. The real-time option allows potential advertisers to incorporate sophisticated decision making that constantly changes their advertising strategies. Further alternatively, the marketplace may allow both real-time bidding as well as pre-arranged bids.

Use of the MV display allows the MV advertising system to display different advertising to different viewers simultaneously from the same MV display. In various embodiments, the MV advertising system relies on an ability to precisely target individual viewers to direct information in numerous directions, in 2D or 3D, with high angular resolution to differentiate among multiple customers in a typical shopping situation. MV advertising systems according to various embodiments are capable of high angular resolution and can precisely target content or media deliveries to individuals in a crowd.

The ability to show content differentiated to each individual, or differentiated to precisely defined zones, is highly valuable in venues shared by many people—such as retail, dining, and entertainment areas. It allows the personalization of messaging that people have come to expect from online/on-phone retail experiences. It incorporates this messaging into the environment rather than on a little screen. It gives the retailer or venue-designer control of how the messaging is incorporated into the overall experience. It leverages real-time observation of the environment and the shopper to create targeted messaging. It further allows messaging in public spaces to be charged/marketed to advertisers by specific criteria, similar to online advertising, while increasing the number of advertisers who can share an MV display. These advantages are not available through other advertising or messaging techniques or technologies, and are made possible by use of the multi-view (MV) display systems.

BRIEF DESCRIPTION OF THE SEVERAL VIEWS OF THE DRAWINGS

In the drawings, identical reference numbers identify similar elements. The sizes and relative positions of elements in the drawings are not necessarily drawn to scale.

DETAILED DESCRIPTION

In the following description, for purposes of explanation, numerous specific details are set forth in order to provide a thorough understanding of the present disclosure. It will be evident, however, to one skilled in the art that the present disclosure may be practiced without these specific details. In other instances, well-known circuits, structures, and techniques are not shown in detail, but rather in a block diagram in order to avoid unnecessarily obscuring an understanding of this description. Thus, the specific details set forth are merely exemplary. Particular implementations may vary from these exemplary details and still be contemplated to be within the scope of the present disclosure. Reference in the description to "one embodiment" or "an embodiment" means that a particular feature, structure, or characteristic described in connection with the embodiment is included in at least one embodiment of the disclosure. The phrase "in one embodiment" located in various places in this description does not necessarily refer to the same embodiment.

Figure 1:
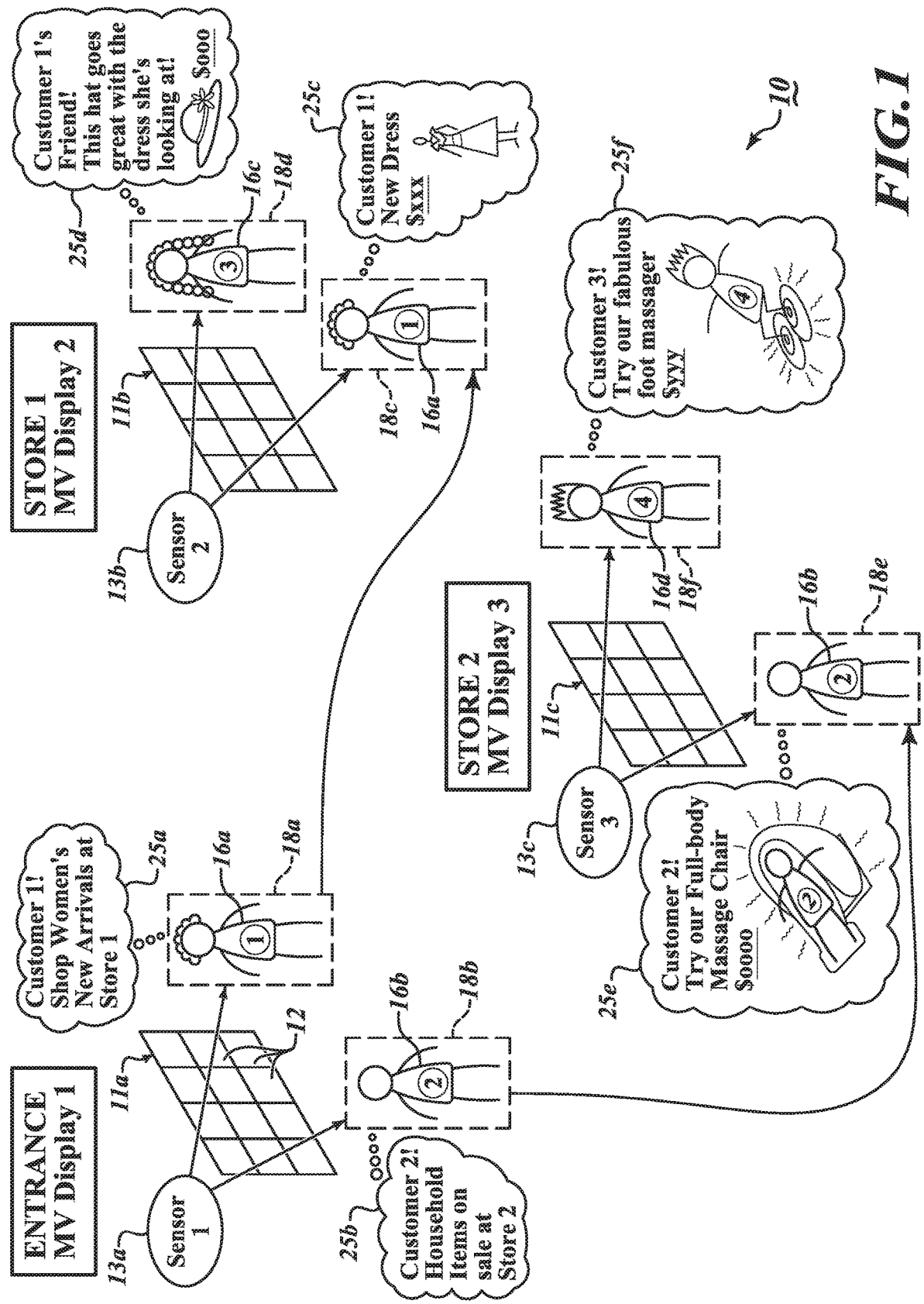
FIG. 1 depicts an embodiment of a multi-view (MV) advertising system.

FIG. 1 is an overall diagram depicting one implementation example of a multi-view (MV) advertising system 10. As used herein, the term "advertising" or "targeted advertising" broadly means the use of multiple versions of individualized (targeted) visual content delivered simultaneously to more than one viewer on the same MV display to influence, persuade, or inform them. As such, the goal of "advertising" is not limited to increasing sales but also includes promoting goodwill, perceived company value, campaigning, public service announcements, special interest advocacy, etc.

In FIG. 1, the MV advertising system 10 includes at least one multi-view (MV) display 11 (three MV displays 11a-11c are shown in the illustrated example) each composed of one or more MV pixels 12, wherein each MV pixel 12 is configured to emit beamlets (individually controllable beams) in different directions in a beamlet coordinate system. The MV advertising system 10 also includes an input node (see 17 in FIG. 3) configured to receive a first attribute of a first viewer 16a or of a first viewing zone 18a where the first viewer 16a is at and a second attribute of a second viewer 16b or of a second viewing zone 18b where the second viewer 16b is at. As will be more fully described below, the first and second attributes may be any characteristics associated with, or indicative of, the viewer 16a/16b and/or the viewing zone 18a/18b, such as the presence or location of the viewer 16a/16b, the viewer's purchase history or path of travel in a store, or the location or other characteristics of the viewing zone 18a/18b. In some embodiments, the MV advertising system 10 may include a sensing system including sensors (three sensors 13a-13c are shown in FIG. 1), which are coupled to the input node 17 and configured to detect the first attribute and the second attribute. For example, the first sensor 13a may be used to detect the presence (the first attribute) of the first viewer 16a and the presence (the second attribute) of the second viewer 16b. In FIG. 1, three MV displays 11a-11c are arranged and three sensors 13a-13c are provided in association with the MV displays 11a-11c, though more or less MV displays and sensors may be provided and, further, the sensors may be provided not necessarily in association with any of the MV displays 11a-11c to detect the first and second attributes.

In other embodiments, no sensors are required to detect and transmit the first and second attributes to the input node 17. Rather, the first and second attributes (e.g., the locations of the first and second viewing zones 18a/18b) may be configured during initial set-up of the MV advertising system 10 and stored in a memory device accessible by the processor via the input node 17 (see FIG. 3). In these embodiments, no sensors may be required to detect the first and second attributes in real-time. When the first and second viewing zones 18a/18b are set up for the first MV display 11a, for example, any viewer that enters the first viewing zone 18a will see a first image intended for the first viewing zone 18a and any viewer that enters the second viewing zone 18b will see a second image intended for the second viewing zone 18b. In this example, no attributes of the viewer 16a/16b need to be detected or sensed.

If the sensors 13a-13c are employed, they may be used to locate and track the viewers (four viewers/shoppers 16a-16d, labeled ①②③④, are illustrated) as they move around a physical space in a store, for example, in which the MV displays 11 and the sensors 13 are arranged. The sensors 13 may be used to detect, sense, or collect not only the first and second attributes but any data useful to the MV advertising system 10.

In general, the sensors 13 allow for the MV advertising system 10 to identify, select, locate, or track viewers (e.g., shoppers) or viewer surrogates such as their phones or vehicles they are traveling in; locate, arrange, or update viewing zones respectively associated with the viewers; monitor, detect, or measure attributes or variables such as viewer behaviors (e.g., purchase behavior, a path of travel) or environmental conditions (e.g., store's lighting condition, congestion level); receive viewer inputs via a viewer surrogate (e.g., the viewer's smartphone); and so forth. For example, the sensors 13 may evaluate lighting, distance from the MV display to the viewer, and other criteria, which may be used by the MV advertising system 10 to adjust targeted advertising content for enhanced visibility to the intended viewer. The sensors 13 may acquire data that can be analyzed and used to pre-program, schedule, or adjust various versions of targeted advertising content and the layout of viewing zones. The sensors 13 may send information to an operator who can then make decisions and implement changes with the use of a user-interface (UI) device (see 19 in FIG. 3, to be described later) coupled to the MV advertising system 10. Further details of the sensor 13 will be described below.

Figure 2:
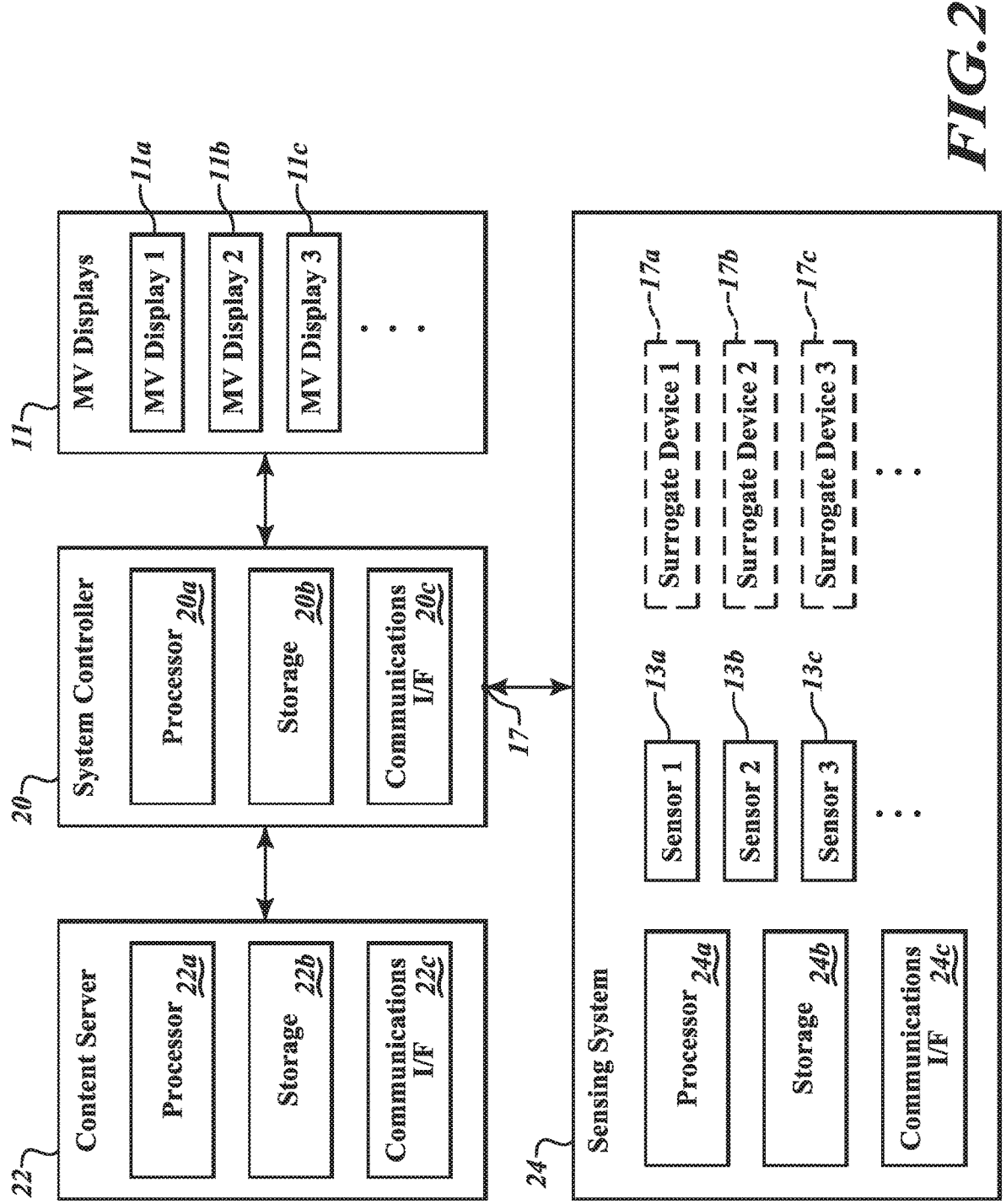
FIG. 2 depicts an embodiment of a system configuration of the MV advertising system of FIG. 1.

Referring additionally to FIG. 2, which depicts a sample system configuration of the MV advertising system 10 of FIG. 1, the MV displays 11a-11c and the sensors 13a-13c are coupled to one or more processors 20a, 22a, 24a which, in the illustrated embodiment, are distributed, in a connected manner, among a system controller 20, a content server 22, and a sensing system 24 of the MV advertising system 10, although in other embodiments their functionalities may be distributed in different manners or may be consolidated into a single processor. The processors 20a, 22a, 24a may be a general-purpose computer capable of, among other tasks, executing an operating system, executing various device drivers, and executing specialized application software used in conjunction with various embodiments of the disclosure. In some embodiments, the processors 20a, 22a, 24a may be a special-purpose processor collectively or individually. The processor 20a, 22a, 24a is capable of populating, updating, using and managing data in a processor-accessible memory or storage 20b, 22b, 24b. Briefly, the storage 20b, 22b, 24b is a volatile storage device (e.g., RAM) and/or a non-volatile, non-transitory storage device (e.g., ROM, EPROM, EEPROM, hard drive(s), flash drive(s) or other solid state memory technology, CD-ROM, DVD) capable of storing, among any other information, data, device drivers and specialized application software which, when executed, enables the processor 20a, 22a, 24a to perform various computations and processing as described in the present disclosure. Various components in the processors 20a, 22a, 24a may be realized by hardware, software, or a combination of hardware and software, and each component may be partly or entirely realized by circuitry, a general-purpose processor or a special-purpose processor executing a software algorithm. The sensing system 24 in the illustrated embodiment includes the sensors 13a-13c coupled to a processor 24a, a storage 24b, and a communications interface 24c. The sensors 13a-13c may be configured to detect the first attribute of the first viewer 16a or of the first viewing zone 18a and the second attribute of the second viewer 16b or of the second viewing zone 18b. The sensors may also detect various other attributes, characteristics, or data usable for the MV advertising system 10. The sensors 13a-13c may be based on any suitable sensing technology including, without limitation, an optical sensor (e.g., camera, video camera, infrared sensor), an ultrasonic sensor, an acoustic sensor, a thermal imaging sensor, an electromagnetic (EM) interrogation system sensor capable of tracking an active object, a GPS system sensor capable tracking an active object, an RF sensor (e.g., RFID system including a reader capable of interrogating an RFID tag), an RF triangulation technique-based sensor, a radar sensor, interaction sensors (e.g., capacitive sensors to determine when a viewer touches a product), motion sensors to detect when a product is moved, sensors to detect presence of a personal device (a surrogate device 17a-17c) such as a cell phone or a tablet as well as to discover information from the personal device, vehicle detection and identification systems, etc. The sensing system 24 may work independently, or may draw on other sources of data to detect, distinguish or determine various attributes. For example, the sensing system 24 may detect a particular cell phone in range, and then query an external database to find the identity of the user, her preferences, and her purchase history.

The multiple sensors 13a-13c may be suitably located relative to each other and relative to the MV displays 11a-11c to comprehensively detect the first and second attributes and any other data as the first and second viewers 16a/16b move around a physical setting such as a store. For example, one or more cameras having suitable lenses and lighting may be used to recognize and locate multiple viewers 16a-16d to specify corresponding viewing zones 18a-18f, respectively. In some embodiments, the camera(s) may be depth-aware cameras, such as structured light or time-of-flight cameras, which can generate a depth map of what is being seen through the camera at a short range. The depth map may then be processed to approximate a 3D representation of what is being seen. In other embodiments, the camera(s) may be stereoscopic cameras and/or LIDAR sensors. Multiple sensors 13 of the same type, or of different types, may be used together. The sensing system processor 24a may run software applications (stored in the storage 24b) such as image processing software to process images captured by the sensors 13a-13c, software that associates each identified viewer with a viewing zone, software that discerns or extracts an attribute/characteristic of each identified viewer, etc. Any of a number of image processing techniques may be used including, without limitation, stitching/registration, morphological filtering, thresholding, pixel counting, image segmentation, face detection, edge detection, blob discovery and manipulation.

In some embodiments, the sensing system 24 further includes surrogate devices 17a-17c associated with the viewers 16a-16c, respectively, which can facilitate detection of the attributes (e.g., presence, location, identity, preferences, demographic information, purchase history, etc., of the viewers). The surrogate devices 17a-17c may be, as non-limiting examples, tags (e.g., passive patterns such as QR code, bar code, or a license plate of a vehicle used as a surrogate device, active optical tags such as blinking IR LEDs, radio tags such as RFID tags, or ultrasonic tags, or kiosks) that the viewers may wear (e.g., incorporated in a badge, wrist band), mobile devices (e.g., smartphones, wands) functioning as communicable/trackable objects that the viewers may carry, conveyances that may transport the viewers such as vehicles, or any other types of markers that may serve as surrogates of the viewers. The surrogate devices may include a user-interface (e.g., a smartphone, a tablet computer, a laptop, or a smartwatch), via which the viewers may input information to the MV advertising system 10, such as the viewer's preferences or interest in purchasing certain products or services, or the viewer's request such as a request to block advertisement of certain products or services. Such information manually entered by the viewers to their surrogate devices 17 is inputted as the attributes of the viewers into the MV advertising system 10. Also, the surrogate devices without a user-interface, such as a laser pointer, may be used by the viewers to input information (attributes of the viewers) to the MV advertising system 10 in order to change or adjust the targeted advertising content presented as an image to each viewer. For example, a viewer may use such surrogate device (e.g., by moving a pointer relative to the MV display) to scroll-down or flip-through targeted advertising content pages visible to the viewer on the MV display. Viewers could dynamically communicate with the MV advertising system 10 in generally three ways: 1) enter info/requests/preferences using a keyboard, touch screen, or microphone on a personal phone or other surrogate device, or at a station or kiosk, etc.; 2) scan or present a card, RFID chip, or quick-read code, etc., at a station or kiosk, or using a personal device such as a reader/scanner/camera on a smart phone, etc.; 3) through use of a pointer or wand or wearable or other intuitive device, or through gestures, or body positioning. In this last category, the wand or wearable device itself functions as a user interface for the viewer to communicate with the MV advertising system 10.

The sensors 13 are configured to communicate with (e.g., receive signals from, interrogate, etc.) the surrogate devices 17a-17c respectively associated with the viewers using any suitable sensing or location technologies or protocols such as Bluetooth, Wi-Fi, cellular, optical, ultrasound, or RFID technology, EM interrogation technology, or GPS technology. The sensing system communications interface (I/F) 24c is responsible for supporting wireless communications among the sensors 13a-13c, the surrogate devices 17a-17c, the sensing system processor 24a, and the system controller 20 using any suitable communications protocols.

The system controller 20 is generally responsible for controlling the MV advertising system 10. The system controller 20 includes a processor 20a, which may run software applications (stored in the storage 20b) to define the first and second viewing zones 18a/18b located relative to the MV display 11a in a viewing zone coordinate system, determine a mapping that translates between the viewing zone coordinate system and the beamlet coordinate system (to be described fully below), and associate first and second targeted advertising contents with the first and second viewing zones 18a/18b, respectively, based at least on the first and second attributes.

For each of first and second images 25a/25b generated from the first and second targeted advertising contents (see FIG. 1), using the mapping, the system controller 20 identifies a bundle of beamlets from the one or more MV pixels of the MV display 11a directed to the first or second viewing zone 18a or 18b to form the first or second image 25a or 25b. The bundle of beamlets directed to the first viewing zone 18a to form the first image 25a visible to the first viewer 16a is different from the bundle of beamlets directed to the second viewing zone 18b to form the second image 25b visible to the second viewer 16b. In FIG. 1, the first image 25a includes a message "Customer 1! Shop Women's New Arrivals at Store 1" and the second image 25b includes a message "Customer 2! Household Items on Sale at Store 2." The system controller 20 outputs control signaling (see 54 in FIG. 3) for the MV pixels of the MV display 11a, which defines color and brightness of each of the beamlets in each bundle to project the corresponding first or second image 25a/25b to the corresponding first or second viewing zone 18a/18b.

In various exemplary embodiments, the system controller processor 20a is configured to associate multiple targeted advertising contents with multiple viewing zones of a single MV display so as to present multiple images, which are generated from the multiple targeted advertising contents, to the multiple viewing zones, to deliver customized, tailored, targeted advertising contents to different viewers simultaneously. The system controller processor 20a may include or be coupled to internal learning systems that allow for automated improvements and enhancements in the capability to associate optimal targeted advertising contents with different viewing zones.

The system controller processor 20a controls the MV display 11a to project images generated from different (targeted/customized) advertising contents to multiple viewing zones 18a/18b to influence, persuade, or inform the viewers 16a/16b respectively located at the viewing zones 18a/18b. In some embodiments, the system controller processor 20a may retrieve the first and second targeted advertising contents from the content server 22. Briefly, the content server 22 includes a processor 22a, storage 22b which stores various contents (or content descriptors or content types), and communications interface (I/F) 22c. Alternatively or additionally, the content server 22 may include interfaces that feed content from content providers, such as a feed from a live camera, or a feed to a broadcasting station. Further alternatively or additionally, the controller processor 20a may generate the first and second targeted advertising contents using computer-executable algorithms, which may be stored in the content server 22.

As used herein, an image presented to a viewer may be any of a static image, a stream of images (video), a text pattern, a lighting pattern, or any other expression of content that is visible to human eyes, as will be more fully described below.

Figure 3:
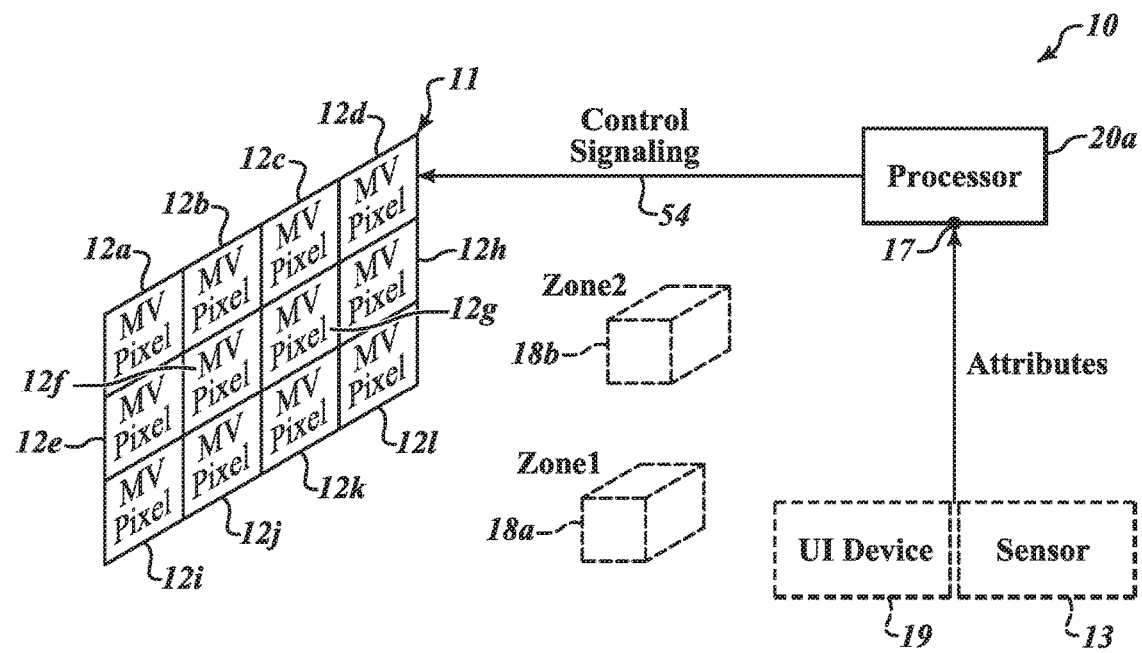
FIG. 3 depicts an embodiment of a multi-view display coupled to a processor.
Figure 8:
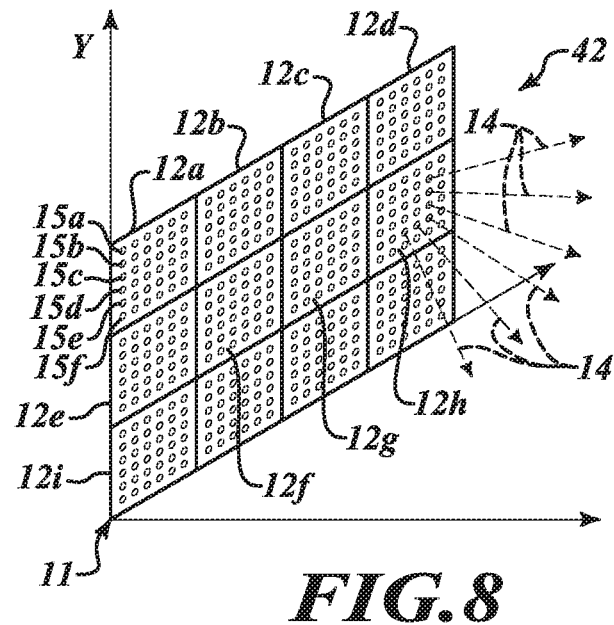
FIG. 8 depicts a beamlet coordinate system according to an embodiment.

FIG. 3 depicts an embodiment of a multi-view (MV) display 11 which is coupled to the system controller processor 20a, and which is optionally coupled to a sensor 13 and/or a user-interface (UI) device 19 to collectively form the MV advertising system 10 of FIG. 1. The MV display 11 includes one or more multi-view (MV) pixels 12 (twelve MV pixels 12a-12l are included in the illustrated example), wherein each MV pixel 12 is configured to emit beamlets 14 in different directions, as additionally depicted in FIG. 8. "Beam lets" as used herein means individually controllable beams emitted from an MV pixel. FIG. 8 illustrates one of the MV pixels 12a-12l emitting multiple beamlets 14 in multiple directions. Unlike an image projector that emits a number of light beams to form an image on a screen, the beamlets 14 from each MV pixel 12 are intended to fall upon the eyes of multiple viewers, such that the multiple viewers respectively see different beamlets (e.g., in different colors and brightness) originating from the same MV pixel(s) 12. As a consequence, the appearance of each MV pixel 12 from the perspective of a viewer is dependent upon the angle at which the viewer looks to the MV pixel 12. For ease of illustration the MV pixel 12h in FIG. 8 is depicted to emit a few beamlets 14, though it should be understood that many more beamlets 14, for example in the order of millions, may be emitted from the MV pixel 12h and from any of the other MV pixels 12.

Referring back to FIG. 3, the MV advertising system 10 includes the input node 17 which, in operation, receives the first attribute of the first viewer 16a or of the first viewing zone 18a and the second attribute of the second viewer 16b or of the second viewing zone 18b. For example, the sensor 13 may be used to detect the first or second viewer 16a or 16b and transmit the detection signals indicative of the presence/location of the first and second viewers 16a and 16b as the first and second attributes to the input node 17. The system controller processor 20a may define, based on the received positions of the first and second viewers 16a/18b, the first and second viewing zones 18a/18b located relative to the MV display 11a in a viewing zone coordinate system. In the illustrated embodiment, the first and second viewing zones 18a ("ZONE 1") and 18b ("ZONE 2") are defined in a viewing zone coordinate system 40, as additionally depicted in FIG. 5. Definition of the first and second viewing zones 18a/18b may be performed in any consolidated or distributed processing configuration. For example, the sensing system processor 24a may define the identified locations of the first and second viewers 16a and 16b as the first and second viewing zones 18a and 18b, respectively, which may then be inputted to the processor 20a via the input node 17.

Figure 5:
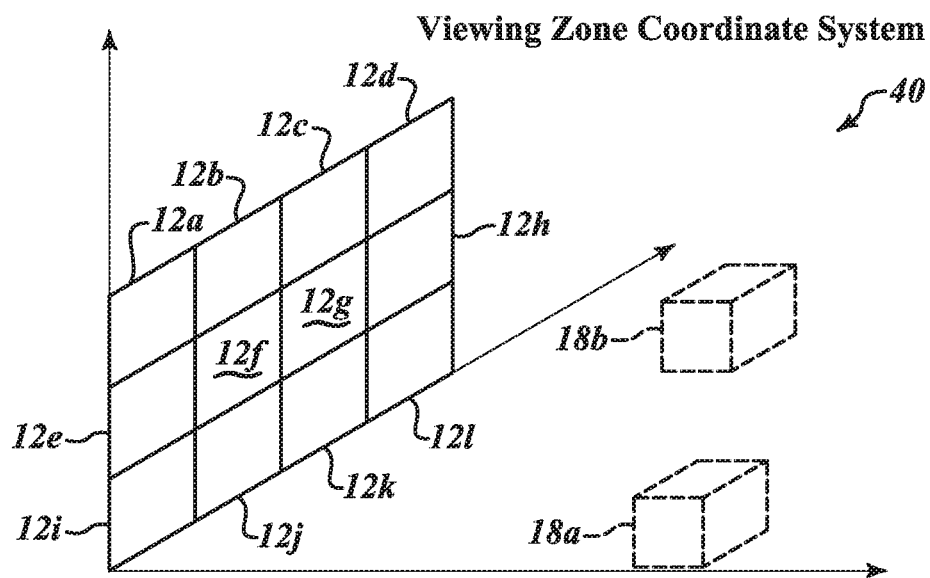
FIG. 5 depicts a viewing zone coordinate system in 3D according to an embodiment.

FIG. 5 illustrates the two viewing zones 18a and 18b, respectively specified as three-dimensional volumes (e.g., boxes), located relative to the one or more MV pixels 12a-12l of the MV display 11. Each viewing zone 18 defines an observation point at which an image formed by the one or more MV pixels 12a-12l is visible. The viewing zone 18 may be defined as a three-dimensional volume (a collection of observation points in 3D), as a two-dimensional area (a collection of observation points in 2D), or as a point.

The viewing zone coordinate system 40 may be any suitable coordinate system, such as a Cartesian coordinate system, or a polar coordinate system in which multiple viewing zones are positioned to surround the one or more MV pixels, for example. Any suitable 3D space modeling method may be used to define the viewing zone coordinate system 40, such as a map, point cloud, wire polygon mesh, and textured polygon mesh. In some embodiments, the viewing zone coordinate system 40 may be based on the physical dimensions of a viewing area in which the multiple viewing zones 18 are defined.

In some embodiments, the viewing zone coordinate system 40 may be within sight of a 3D sensor attached to the MV pixels (e.g., a depth sensor, a stereoscopic camera) and the viewing zone coordinate system 40 can be the 3D coordinate system of the 3D sensor. For example, a real-life 3D environment is scanned by a 3D sensor (e.g., stereoscopic camera) to derive the 3D viewing zone coordinate system 40, in which multiple viewing zones may be specified.

Figure 6:
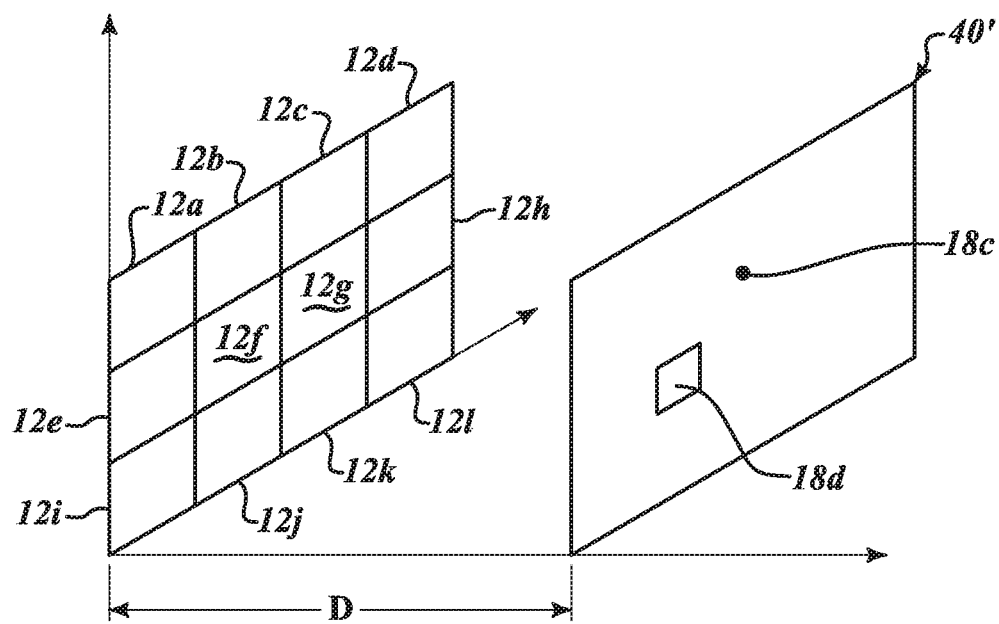
FIG. 6 depicts a viewing zone coordinate system in 2D according to an embodiment.

In other embodiments, the viewing area may be within sight of a 2D camera attached to the MV pixels, wherein the 2D camera is used as a sensor to identify the multiple viewers to be respectively associated with multiple viewing zones. In this case the viewing zone coordinate system 40 is based on the 2D pixel coordinate system of the 2D camera. For example, FIG. 6 illustrates a sample viewing zone coordinate system 40' in 2D, which may be based on the 2D pixel coordinate system of the 2D camera (not shown). In this example, the 2D viewing zone coordinate system 40' is set on a plane at a distance D from the one or more MV pixels 12a-12l. A point 18c or an area 18d may be specified in the 2D viewing zone coordinate system 40' to represent a viewing zone. It is noted that the 2D viewing zone coordinate system 40' may be in a shape other than a plane, such as a hemisphere or other non-planar surface. In some embodiments, it may be desirable for each point in the 2D viewing zone coordinate system 40' to have a unique viewing angle to the MV pixels 12a-12l, such that the bundle of beamlets directed towards each viewing zone, which is formed of one or more of those points each having a unique viewing angle, can be uniquely identified. Then, multiple non-overlapping viewing zones in the 2D viewing zone coordinate system 40' may be associated with (or "hit" by) mutually exclusive bundles of beamlets.

Figure 7A:
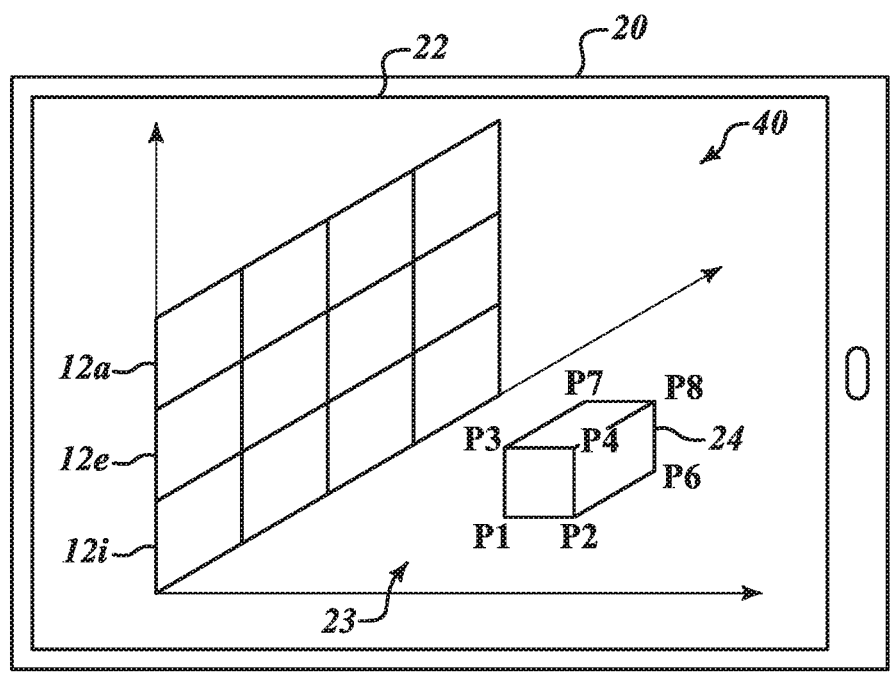
FIG. 7A depicts a sample screen view of a user interface device usable to specify multiple viewing zones in a viewing area relative to the MV display.

Multiple attributes of multiple viewers or of multiple viewing zones may be received via the input node 17 in various ways. According to some embodiments, the MV advertising system 10 includes the UI device 19 (see FIG. 3) which, in operation, receives an operator specification of the attributes of the multiple viewing zones 18 and transmits the attributes to the processor 20a via the input node 17. FIG. 7A illustrates a sample UI device 19, which includes a screen 22 (e.g., touchscreen) capable of displaying a representation of a viewing area 23 relative to the one or more MV pixels 12a-12l in the viewing zone coordinate system 40. The UI device 19 in these embodiments may be any of a tablet computer, as depicted in FIG. 7A, a laptop or desktop computer, or any electronic device that includes a screen (e.g., smartphone) and is capable of running a viewing zone specification application configured to permit specification of multiple viewing zones 18 in the viewing area 23. The operator may specify a viewing zone in the viewing area 23 in the viewing zone coordinate system 40 via the screen 22 (e.g., touchscreen) or keyboard or any other input device (not shown) of the UI device 19. The operator of the UI device may be a MV advertising system operator who sets up the MV advertising system 10 for shoppers, or any of the shoppers (MV display viewers) himself.

The operator may specify each viewing zone graphically, for example, by "drawing" a point, a 2D shape (e.g., a polygon, circle, oval, freeform shape) and/or a 3D shape (e.g., a box, sphere) that represents an observation point or represents (e.g., encloses) a collection of observation points. In the illustrated example of FIG. 7A, the operator has drawn a 3D shape of a box 24 that encloses a collection of observation points, from which a particular image should be visible. The graphically-input multiple viewing zones 18 may be represented as shapes or other indicia superimposed on the viewing area 23 on the screen of the UI device 19. Additionally or alternatively, the operator may specify the multiple viewing zones 18 by text, for example, by entering the coordinates of the vertices (P1-P8) of a box 24 that defines each viewing zone via a keyboard of the UI device 19.

Another procedure to lay out or define viewing zones may be aided by use of a camera or cameras on or near the MV display, which captures the areas and vantage points from which the MV display may be seen. Using such procedure, the viewing zone designer (e.g., operator of the MV advertising system 10) may consider environmental criteria, such as obstructions, number of people, viewer positioning, context, lighting conditions, and other variables when defining the viewing zones 18a/18b.

In various embodiments, the UI device 19 allows for an initial mapping or definition of viewing zones and the assignment of various targeted advertising contents to the viewing zones, respectively. The UI device 19, perhaps in combination with the sensing system 24, may also allow for the timed, triggered, random, or real-time re-mapping of the viewing zones (perhaps by the shopping viewer himself). Other viewing-zone definition procedures may include, as non-limiting examples, identifying viewing zones by moving over them with a location-sensing technology; by pointing to the viewing zones or the boundaries of the zones with a laser, light, or other means; by viewers establishing their location using a device, gesture, command, identifier, or other means; by using markers, reflectors, sensors; or by referencing a map, blueprint, or computer model. In some embodiments, the UI device 19 need not include a screen capable of displaying a viewing area, for example, when the operator may not require a visualization of the viewing area in order to specify attributes of multiple viewing zones. In these embodiments, the UI device 19 need only include a UI component configured to receive the operator specification of attributes of multiple viewing zones. The UI component may be, without limitation, a keyboard or keypad on which the operator may type indications (e.g., seat numbers, section numbers in front of an MV display) corresponding to viewing zones; a microphone into which the operator may speak indications of viewing zones; a touch/gesture-sensitive pad on which the operator may tap/gesture indications of viewing zones; an optical pointer the operator may use to point into the viewing area to specify each viewing zone, etc.

Additionally or alternatively, the operator (who may be the shopping viewer himself or a different individual) may use the UI device 19 to specify attributes of multiple viewers by text, for example, by entering the viewer location, the viewer preferences, the viewer's purchase history, etc. In these embodiments, where the operator is the viewer (shopper) himself, the UI device 19 may correspond to the surrogate device 17a-17c that forms part of the sensing system 24 in FIG. 2.

Figure 7B:
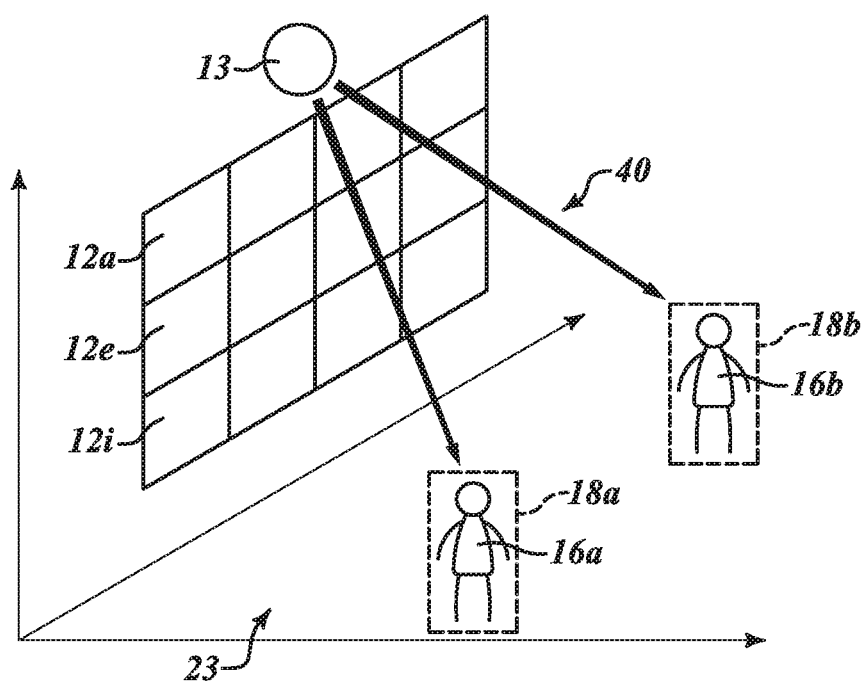
FIG. 7B depicts sample use of a sensor to specify multiple viewing zones based on multiple viewers whose locations are identified by the sensor.

As described above, the MV advertising system 10 may include a sensor 13 configured to detect attributes of the viewers 16 or of the viewing zones 18 and to send the detected attributes to the processor 20a via the input node 17, as shown in FIG. 3. FIG. 7B illustrates a sample sensor 13, which can identify (e.g., detect) locations of multiple viewers 16a and 16b, wherein the detected locations may be used to define the multiple viewing zones 18a and 18b in the viewing zone coordinate system 40.

In the illustrated example of FIG. 7B, the sensor 13 detects locations of the viewers 16a/16b, and specifies the detected locations of the viewers as the multiple viewing zones 18a and 18b. For example, a point, a 2D shape and/or a 3D shape may be assigned to each detected viewer 16 (e.g., a 3D box that encloses the viewer 16), and the assigned point, 2D shape and/or 3D shape may be used to define the viewing zone 18 for the viewer 16. The processing to specify multiple viewing zones based on the locations of the viewers 16a/16b identified by the sensor 13 may be performed by a processor of the sensor 13 and/or the system controller processor 20a of the MV advertising system 10.

In further embodiments, the sensor 13 may be configured to identify (e.g., pick up) further attributes of the viewing zone, such as audio (e.g., speech or other sound made by a viewer or viewer surrogate), temperature (e.g., heat emanating from a viewer or viewer surrogate), etc. The identified attributes may be used, for example, by a zones-and-contents association module 36 of the processor 20a, to be described below, to select or generate appropriate targeted advertising content for the viewing zone (e.g., a cold drink advertisement selected/generated for a viewer in a high-temperature viewing zone).

FIG. 8 schematically depicts the beamlet coordinate system 42, which may be any suitable coordinate system such as a Cartesian coordinate system and a polar coordinate system. The beamlet coordinate system 42 identifies each of the beamlets emitted from each MV pixel 12, which follows a specific propagation path. For example, the propagation path of each beamlet may be defined by the beamlet's origin in the MV pixel and the (unit) vector that defines its propagating direction, or may be characterized by a combination of angles such as azimuth $\alpha$ and altitude $\beta$ angles formed by the beamlet. As further examples, any suitable 3D space modeling method may be used to define the beamlets' propagation paths in the beamlet coordinate system 42, such as a point cloud method that specifies a set of data points that form each propagation path or a voxel data method that specifies a set of voxels (a volume having unit x-y-z dimensions) that form each propagation path. Other 3D modeling methods may be used, such as a 3D map, wire polygon mesh, and textured polygon mesh. In some embodiments, as illustrated in FIG. 8, the beamlet coordinate system 42 explicitly identifies each of the beamlets by the beamlet's origin 15a, 15b, 15c . . . , in each MV pixel 12a, wherein each beamlet's origin is implicitly associated with its propagation path. In other embodiments, the beamlet coordinate system 42 may explicitly identify each of the propagation paths of the beamlets.

In some embodiments, the propagation path of each beamlet may be found based on a geometric model of the one or more MV pixels. For example, the geometric definitions of and relationships among the beamlets of an MV pixel may be found in a factory via calibration measurements, or may be inferred from the opto-mechanical design of the MV pixel, such as a known radial distortion of a lens included in the MV pixel. In various embodiments, the beamlets (e.g., the sources of the beamlets) in each MV pixel are arranged in a geometric array (e.g., 2D array, circular array). Propagation paths of the beamlets arranged in a geometric array can be geometrically defined using any suitable mathematical techniques including, without limitation, linear interpolation; linear extrapolation; non-linear interpolation; non-linear extrapolation; Taylor-series approximation; linear change of reference frame; non-linear change of reference frame; polynomial, spherical and/or exponential models; and trigonometric manipulation. As a particular example, once the propagation paths of selected beamlets are geometrically defined, suitable interpolation techniques may be used to find the propagation paths of the beamlets between those geometrically-defined beamlets. In other embodiments, the propagation path of each beamlet may be found by flashing patterns on the MV pixels (e.g., by selectively turning on and off the beamlets on each MV pixel) to uniquely encode every beamlet, and capturing the images of the flashing patterns using a camera placed in a viewing area of the MV pixels. The captured images can then be plotted onto the beamlet coordinate system 42 to geometrically define respective propagation paths of the beamlets. Various encoding patterns may be used as the flashing patterns, including, without limitation, Gray-code patterns, non-return-to-zero (NRZ) digital sequences, amplitude-shift-keyed (ASK) bits, maximum-length sequences, and shift-register sequences.

Although beamlets 14 are depicted in the accompanying figures as simple lines with arrowheads indicating their directions of emission, they can have an angular component and can be in any shape. Thus, characterization of the beamlet as a simple line is an approximation, which is a valid model in some embodiments but in other embodiments the beamlet may be modeled as having a shape similar to the beam from a search light, for example. In various exemplary embodiments, each beamlet 14 is wide/large enough such that both eyes of a viewer are expected to be within the beamlet 14 and the beamlet 14 falls upon both eyes of the viewer. Thus, the viewer sees the same beamlet 14 (e.g., the same color and brightness) with both of the eyes. In other embodiments, each beamlet 14 is narrow/small enough such that two different beamlets 14 are individually controlled to fall upon two eyes of a viewer, respectively. In this case the viewer sees two beamlets 14 of possibly different colors and/or brightness with his/her two eyes, respectively.

Figure 4:
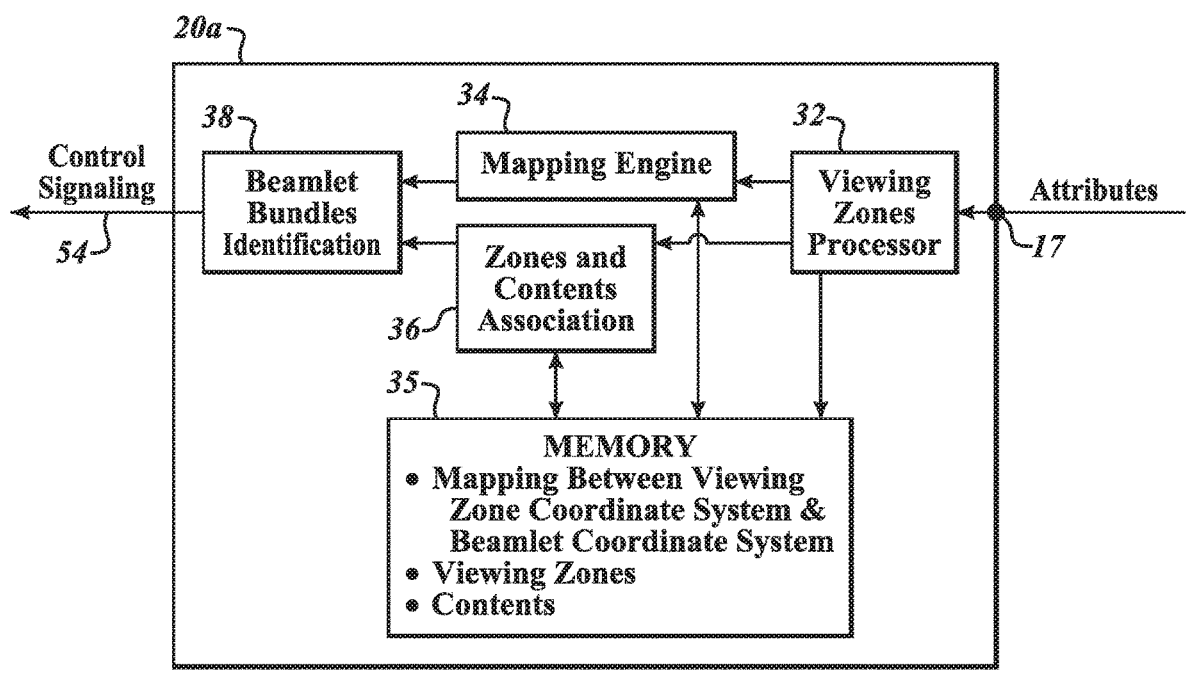
FIG. 4 depicts an embodiment of the processor of FIG. 3.

The processor 20a is capable of populating, updating, using and managing data in a processor-accessible memory 20b/35, which is illustrated as part of the processor 20a in FIGS. 2 and 4 though may be provided external to the processor 20a in some embodiments. Although the memory 35 is illustrated as a single device in FIG. 4, in various embodiments, the memory 35 may be divided into multiple storage devices.

The processor 20a receives, via the input node 17, the first and second attributes of the multiple viewers 16a and 16b or of the multiple viewing zones 18a and 18b, for example, from the UI device 19 (see FIG. 7A) or from the sensor 13 (see FIG. 7B).

The processor 20a associates first and second targeted advertising contents with the multiple viewing zones 18a and 18b based at least on the first and second attributes. This may be done by associating the multiple contents themselves with the multiple viewing zones 18a and 18b, or by associating multiple content descriptors, such as multiple content providers (e.g., live stream sources, cable channels of promotional material, commercial websites, social websites) or multiple content types, with the multiple viewing zones 18a and 18b.

The processor 20a determines (e.g., identifies, accesses) a mapping that translates between the viewing zone coordinate system 40 (FIG. 5) and the beamlet coordinate system 42 (FIG. 8). In various embodiments, a mapping between the viewing zone coordinate system 40 and the beamlet coordinate system 42 is generated and stored (or pre-stored) in the memory 35, which the processor 20a may access. In other embodiments, the processor 20a may generate a mapping between the viewing zone coordinate system 40 and the beamlet coordinate system 42 during runtime using a real-time calibration process.

The mapping may take any of various forms, such as a table or a mathematical relationship expressed in one or more translational functions. In some embodiments, the mapping may be based on registration of reference indicia (e.g., points, lines, shapes) defined in the viewing zone coordinate system 40 and in the beamlet coordinate system 42. For example, a first camera attached to the one or more MV pixels 12 is used to capture images of a viewing area 23 of the MV pixels 12. A registration device (not shown) including a second camera and a light source (e.g., an LED) is placed in the viewing area, and the light source is flashed, which is captured by the first camera of the MV pixels 12. The location of the flashing light in the viewing area as imaged by the first camera may serve as a reference in the viewing zone coordinate system 40 (which may be based on the coordinate system of the first camera). Encoding patterns (e.g., Gray-code patterns, non-return-to-zero (NRZ) digital sequences, amplitude-shift-keyed (ASK) bits, maximum-length sequences, shift-register sequences) are flashed on the one or more MV pixels (by selectively turning on and off the beamlets on each MV pixel) to uniquely encode every beamlet emitted from each MV pixel. The beamlet from each MV pixel that is captured by the second camera of the registration device placed in the viewing area may be identified (because each beamlet is uniquely encoded) and used as a reference in the beamlet coordinate system 42. The same process may be repeated with the registration device moved to different positions in the viewing area, to thereby obtain a set of references in the viewing zone coordinate system 40 and a set of references in the beamlet coordinate system 42. The mapping that translates between the two coordinate systems 40 and 42 may be found so as to register, align or otherwise correlate these two sets of references in the two coordinate systems. Any other registration techniques in image processing, such as automatic 3D point cloud registration, may also be used to perform the registration.

Figure 9A:
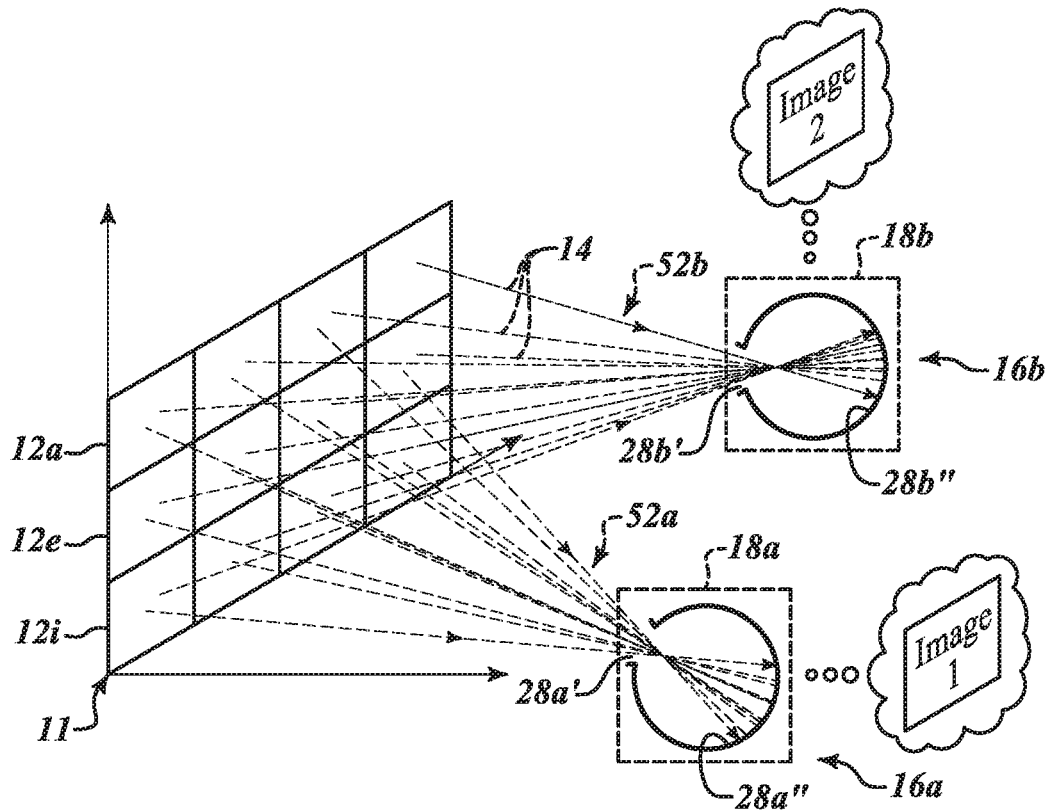
FIG. 9A depicts a sample process of using a mapping, which translates between the viewing zone coordinate system and the beamlet coordinate system, to identify a bundle of beamlets from the one or more MV pixels directed to each of the multiple viewing zones to form a corresponding image.

As illustrated in FIG. 9A, for each of multiple images ("IMAGE 1" and "IMAGE 2") generated from the multiple contents, the processor 20a, using (applying) the mapping determined (e.g., identified, accessed, generated) above, identifies a bundle of beamlets 14 from each of the MV pixels 12a-12l directed to one viewing zone 18 to form the image. As illustrated, each bundle 52a or 52b includes the beamlets 14 that are "hitting" the pupil 28a' or 28b' and spread to the retina 28a" or 28b" of the viewer 16a or 16b to form "IMAGE 1" or "IMAGE 2" in each viewer's brain. The bundle 52a of beamlets 14 directed to the pupil 28a' in one viewing zone 18a to form one image "IMAGE 1" in the viewer 16a's brain is different from the bundle 52b of beamlets 14 directed to the pupil 28b' in another viewing zone 18b to form another image "IMAGE 2" in the viewer 16b's brain. As shown in FIG. 3, the processor 20a outputs control signaling 54 for the MV pixels 12a-12l. The control signaling 54 defines color and brightness (and any other imaging parameters as desired) of each of the beamlets 14 in each bundle 52 to project the corresponding image to the corresponding viewing zone 18. The MV pixels 12a-12l, in response to the control signaling 54 from the processor 50, project the multiple images to the multiple viewing zones, respectively.

Figure 9B:
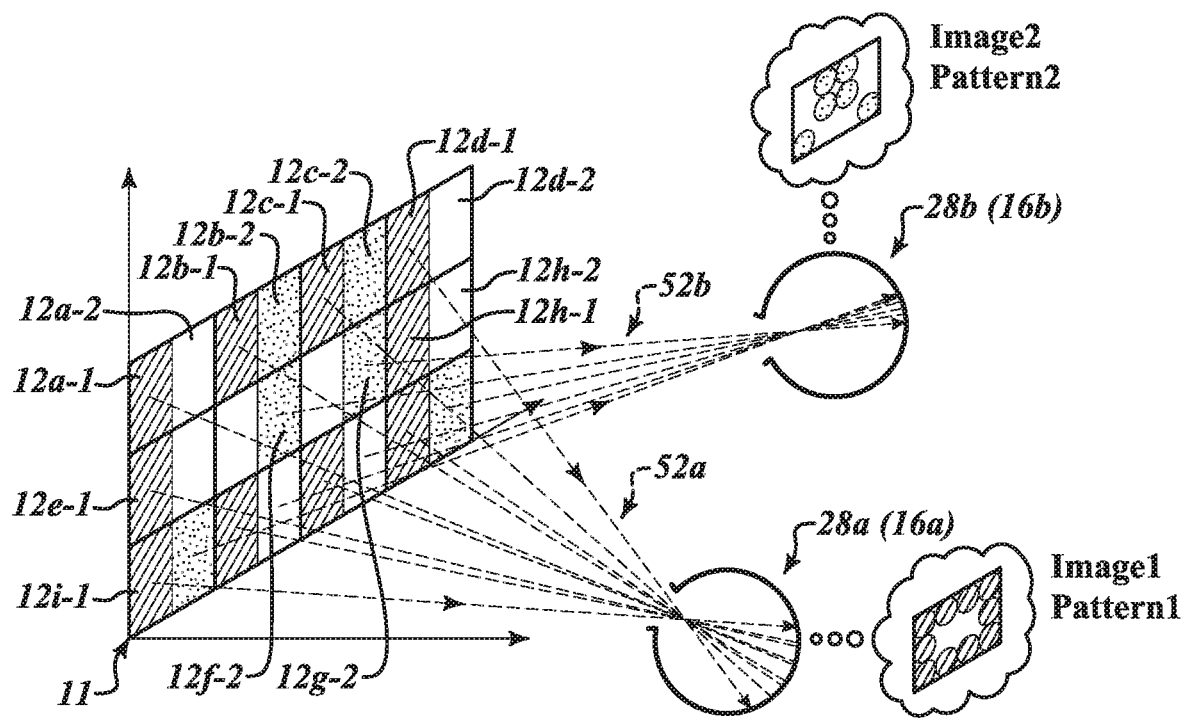
FIG. 9B depicts an example in which the MV pixels project different bundles of beamlets to different viewing zones, respectively, to present different images (IMAGE 1 and IMAGE 2 having different patterns) to the eyes located at the viewing zones.
Figure 9C:
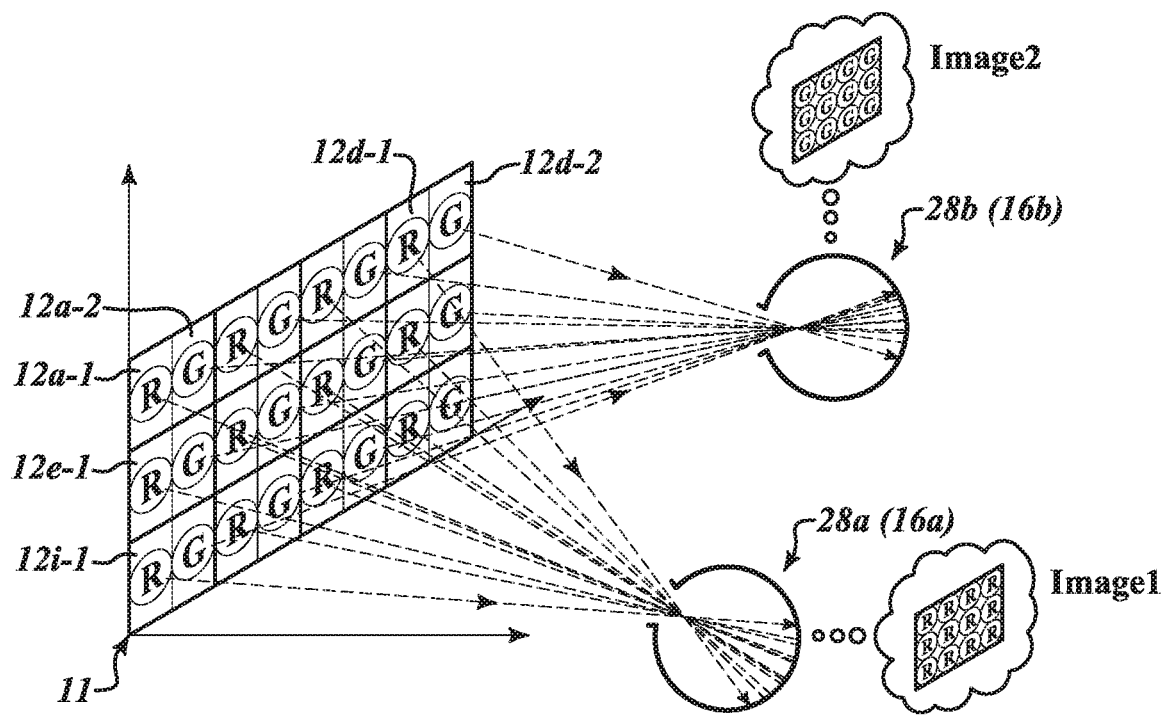
FIG. 9C depicts another example in which the MV pixels project different bundles of beamlets to different viewing zones, respectively, to present different images (IMAGE 1 and IMAGE 2 having different colors) to the eyes located at the viewing zones.

FIGS. 9B and 9C depict examples in which the MV pixels 12a-12l function to form two different images for two different viewers located at two viewing zones. In FIGS. 9B and 9C, each MV pixel is divided into two sections (e.g., 12a-1 & 12a 2), and it is assumed that the first sections (12a-1, 12b-1, 12c-1, et seq.) emit beamlets directed to the first viewing zone where the first viewer 16a (more specifically, the first viewer's eye 28a) is located, while the second sections (12a-2, 12b-2, 12c-2, et seq.) emit beamlets directed to the second viewing zone where the second viewer 16b (or the second viewer's eye 28b) is located. The control signaling 54 defines color and brightness of each of the beamlets 14 in each bundle to project the corresponding image to the corresponding viewing zone.

In FIG. 9B, the first sections of ten (10) MV pixels that form a rectangular pattern (12a-12d, 12e, 12h, and 12i-12l) emit beamlets having the color and brightness represented by "hatching" to the eye of the first viewer 16a such that the first viewer 16a sees IMAGE 1 having Pattern 1. The second sections of six (6) MV pixels (12b-12c, 12f-12g, 12i and 12l) emit beamlets having the color and brightness represented by "blotching" to the second viewer 16b such that the second viewer 16b sees IMAGE 2 having Pattern 2 that is different from Pattern 1 of IMAGE 1.

In FIG. 9C, the first sections of all twelve (12) MV pixels (12a-12l) emit beamlets having the color and brightness represented by "R" to the eye of the first viewer 16a such that the first viewer 16a sees IMAGE 1 in red. The second sections of all twelve (12) MV pixels (12a-12l) emit beamlets having the color and brightness represented by "G" to the second viewer 16b such that the second viewer 16b sees IMAGE 2 in green.

In each of these examples, a bundle of beamlets 14 that will "hit" one viewing zone is identified, and the color and brightness of each of the beamlets in the bundle are set, by the control signaling 54, to correspond to the content associated with the viewing zone so as to form an image based on the content at the viewing zone.

As used herein, "image" means anything that results from a pattern of illumination from the one or more MV pixels 12. The pattern of illumination is generated by turning "on" or "off" each of the beamlets emitted from each MV pixel 12 and/or controlling color and brightness (intensity) of each of the beamlets. Non-limiting examples of an image include any one or a combination of a static image, a stream of images (e.g., video), a text pattern (e.g., messages, signage), a lighting pattern (e.g., beamlets individually or collectively blinked, flashed, e.g., at different or varying speeds, at different brightness/dimness levels, at different brightness/dimness increase or decrease rates, etc., or otherwise turned "on" and "off"), and any other expression of content that is visible to human eyes.

An MV display 11 may consist of a single pixel, or an array of pixels arranged in a traditional display format, or a collection of irregularly placed pixels that may follow the contours of a skyline, the curves of a road, or the branches of a tree, as examples.

Each MV pixel 12 may be able to simultaneously project light rays of various colors and brightness. Similarly, each MV pixel may simultaneously direct light in some directions, and show no light at all in other directions. The MV pixels may resemble small projectors, or consist of lenses over a display panel, or consist of any of a variety of technologies able to achieve the desired effect of simultaneously sending different visual information in different directions from the same MV pixel or array of MV pixels, as described in the co-assigned patent application titled "DISPLAY SYSTEM AND METHOD FOR DELIVERING MULTI-VIEW CONTENT" incorporated herein above. In this manner, the color and brightness of each pixel, or the use of light or no-light, or other characteristics such as blinking, or fading and intensifying, or alternating between colors, may depend on the location of the viewer relative to the MV display. If an MV pixel is projecting the color red to the right, and the color green to the left, individuals simultaneously observing the same MV pixel will each see a different color depending on which side of the MV display they are standing. Likewise, an MV pixel may shine light in one direction but not another, so a person standing in one place sees a light, while a person in another place sees dark. Further, an MV pixel may appear to blink, or fade and intensify in brightness, or alternate between colors, at different rates when viewed from one location versus another location.

MV displays may be blended with regular displays, screens, projections, printed and painted surfaces, and other media. They may serve as an extension of other signage, where only a portion of the sign needs to have multi-view capabilities.

MV displays can be configured into many different shapes, forms, sizes, and configurations. For example, graphics, signals, guides, lights, and other forms of messaging and imagery can be incorporated into architecture, interiors, furnishings, landscaping, land forms, and other environmental features, elements, and surroundings.

In some embodiments, the control signaling 54 may define, in addition to color and brightness, other parameters of each of the beamlets 14 from each MV pixel 12, such as spectral composition, polarization, beamlet shape, beamlet profile, focus, spatial coherence, temporal coherence, and overlap with other beamlets. Specifically, beamlets generally do not have a sharp edge and thus adjacent beamlets may somewhat overlap. The degree of overlap may be controlled by one of the beamlet parameters.

The control signaling 54 for the MV pixels 12 may be output from the processor 20a via any suitable medium including wireline and/or wireless medium, and via any suitable protocol (e.g., Bluetooth, Wi-Fi, cellular, optical, ultrasound). FIG. 4 illustrates details of the processor 20a of the MV advertising system 10 according to one embodiment. Various components 32, 34, 36 and 38 in the processor 20a of FIG. 4 may be realized by hardware, software, or a combination of hardware and software, and each component may be partly or entirely realized by circuitry, a general-purpose processor or a special-purpose processor executing a software algorithm.

The processor 20a receives the first attribute of the first viewer 16a or of the first viewing zone 18a and the second attribute of the second viewer 16b or of the second viewing zone 18b via the input node 17.

In the processor 20a, a viewing zones processor 32 is responsible for processing the first and second attributes to define the first and second viewing zones 18a and 18b. In some embodiments, the first and second attributes received via the input node 17 may be specification of the first and second viewing zones 18a and 18b as explicitly defined in the viewing zone coordinate system 40 on the UI device 19 by an operator. In other embodiments, the first and second attributes received via the input node 17 may be the locations of multiple viewers 16a and 16b as identified by the sensor 13. In these embodiments, the viewing zones processor 32 receives the identified locations of multiple viewers, and performs processing necessary to define the multiple viewing zones 18 based on the identified locations, such as by defining a point, a 2D shape, or a 3D shape that corresponds to each of the identified locations. The viewing zones processor 32 may use any of a number of image-processing techniques to process (e.g., recognize) the locations of multiple viewers (perhaps associated with surrogate devices 17) as identified by the sensor 13, such as stitching/registration, morphological filtering, thresholding, pixel counting, image segmentation, face detection, edge detection, and blob discovery and manipulation.

In various embodiments, the multiple viewing zones defined by the viewing zones processor 32 may be stored in the memory 35 to be accessible by various components of the processor 20a.

The zones-and-contents association module 36 running an association application associates multiple targeted advertising contents with the multiple viewing zones 18, respectively, based on the multiple attributes received via the input node 17. To that end, the memory 35 may store the multiple targeted advertising contents and/or content descriptors of the multiple targeted advertising contents, or may store interfaces that feed to targeted advertising content providers, or may store computer-executable algorithms, which the processor 20a may use to generate (create) the targeted advertising contents to be associated with the multiple viewing zones 18.

The association program running on the zones-and-contents association module 36 is responsible for fetching, accessing, or creating multiple targeted advertising contents for multiple viewing zones, respectively, based on the multiple attributes. The association program may refer to defined association rules to associate the multiple viewing zones 18 with multiple targeted advertising contents. For example, targeted advertising contents may be associated with the locations of the viewing zones relative to the MV display 11, so as to generate targeted advertisement images that are particularly selected as appropriate for display at those locations. As another example, targeted advertising contents are associated with the viewers at the viewing zones, so as to generate targeted advertisement images that are particularly selected as appropriate for those viewers.

The attributes that may be used to select and associate targeted advertising contents with viewing zones, respectively, may include, as non-limiting examples, the presence of the viewer, a location of the viewer, a characteristic of the location of the viewer (e.g., distance from the MV display), an aggregate characteristic of a group the viewer belongs to (e.g., in a group shopping setting), an aggregate viewer response history (e.g., how other viewers responded in the past to various versions of content and viewing zone configurations; historic data that can be continuously updated to make the MV advertising system more effective based on, for example, self-learning by experimenting with content, viewing zones, and attribute weighing), externally-observable characteristics of the viewer (e.g., based on facial recognition), an externally-observable behavior of the viewer, a path of travel followed by the viewer, a speed of the viewer, biometric information of the viewer (e.g., temperature, heart rate, eye-tracking of the viewer), demographic information of the viewer, preferences of the viewer (e.g., as explicitly inputted by the viewer using the surrogate device 17 or the UI device 19, or implicitly inferred based on the viewer's purchase history), identity of the viewer, information inputted by the viewer (e.g., via the surrogate device 17 or the UI device 19), purchase history of the viewer (e.g., as collected from the store's point of sales system), a location of the viewing zone, an environmental condition of the viewing zone (e.g., temperature), and a characteristic of the viewing zone (e.g., a spatial condition relative to surrounding structures).

The attributes of multiple viewers or of multiple viewing zones may be stored in one or more memory devices, which the processor 20a may access in order to associate multiple targeted advertising contents with the multiple viewing zones. The attributes that may be stored include, as non-limiting examples, the location of the viewer, a characteristic of the location of the viewer, an aggregate characteristic of a group the viewer belongs to, an aggregate viewer response history, externally-observable characteristics of the viewer, an externally-observable behavior of the viewer, a path of travel followed by the viewer, a speed of the viewer, biometric information of the viewer, demographic information of the viewer, preferences of the viewer, identity of the viewer, information inputted by the viewer, purchase history of the viewer, a location of the viewing zone, a spatial or environmental condition of the viewing zone, and a characteristic of the viewing zone.

In some embodiments, the zones-and-contents association module 36 may refer to an "external" attribute, which impacts the association of both the first and second targeted advertisements with the first and second viewing zones substantially equally. For example, an external attribute indicative of a crowd size/flow (e.g., a congested state in the store) may impact the association process to assign the targeted advertising contents to multiple viewing zones so as to disperse the shoppers. As another example, an external attribute indicative of a store-wide discount time period may impact the association process to assign the targeted advertising contents to multiple viewing zones so as to inform all shoppers of the store-wide price markdown to promote overall sales for the store. As another example, an external attribute indicative of timing (e.g., close to the store closing time) may impact the association process to push sales of food products that are nearing their expiration dates. As yet another example, an external attribute indicative of an MV display environment (e.g., temperature rise) may impact the association process to address the environmental condition (e.g., to promote cold drinks, summer clothes, air conditioners, etc.) In some embodiments, the zones-and-contents association module 36 may refer to a "composite" attribute that is symbiotically derived from the first and second attributes of the first and second viewers or of the first and second viewing zones. For example, the composite attribute may indicate the first and second targeted advertising contents that are designed to facilitate collective purchase decisions by the first and second viewers in a group shopping setting.

Unlike online shopping which tends to be a solitary activity, shopping in the real-world is often done in groups. A visit to any mall will find husbands and wives, friends, co-workers, schoolmates, and many others shopping together in a social fashion. Although a single person typically performs the actual purchase, the decision is often reached through consultation with the other members of the shopping group. Rather than trying to target each individual for a sale, it may be beneficial to target the group as a whole, helping them build a collective case for purchasing a product.

Consider the case of a husband and wife in a men's department, selecting an outfit for the man. A typical group dynamic might be for the man to be seeking assurance from his wife that the outfit he is considering is right for him. If he sees a display that says he looks stylish, he may well discount it as advertising. However, if he hears the same comment from his wife, he is likely to weigh it more heavily. An MV advertising system can leverage this dynamic by seeding different information among the group shoppers that, for example, allows the non-purchasers to serve as surrogate sales people—feeding them complimentary information.

Use of a "composite" attribute symbiotically derived from the first and second attributes allows for this sort of complimentary group advertising. In various embodiments, composite attributes contain information relating to a shopping group. A group can be recognized (e.g., by the sensing system 24) as people who appear to be staying together as they traverse an environment. Another way would be to recognize that people in near proximity have a close relationship, for example, based on an active connection on social media (e.g., discernable from their surrogate devices 17, such as smartphones) and are probably shopping together. Further examples of use of a composite attribute to associate multiple targeted advertising contents with multiple viewing zones will be provided below.

There also are other examples where physical proximity causes issues that may be addressed through MV advertising. Consider a situation where multiple products are on display and there are multiple people that, based on prior purchase history, have different likelihoods of purchasing each product. Presume there is only one of each product in stock. If each person's advertising content is chosen independently, they might all be directed to the same popular product. Not only might they have trouble physically crowding around that one product, if one of them buys it, the rest may be disappointed and leave. It could be better to initially direct them to different products so as to maximize the chances of the highest total sales. Such targeted advertisement that is designed to maximize the highest total sales may be achieved by using a composite attribute that indicates the first targeted advertising content of a first product (e.g., the popular product) for the first viewer to facilitate an individual purchase decision by the first viewer and the second targeted advertising content for the second viewer, which is different from the first targeted advertising content to divert the second viewer from the first product.

In some embodiments, multiple contents to be associated with the multiple viewing zones 18 based on the first and second attributes, and optionally and additionally on external attributes and composite attributes, may be generated in real time by the zones-and-contents association module 36. For example, the association application running on the zones-and-contents association module 36 may generate targeted advertising content (e.g., signage, a lighting pattern) in real time for each viewing zone as a function of the attributes using a suitable association algorithm.

The mapping engine 34 of the processor 20a determines (e.g., identifies, accesses, generates) a mapping that translates between the viewing zone coordinate system 40 and the beamlet coordinate system 42. In various embodiments, the mapping may be stored (or pre-stored) in the memory 35, in which case the processor 20a accesses the stored mapping.

Multiple mappings (e.g., one that translates from the viewing zone coordinate system 40 to the beamlet coordinate system 42, and another that translates from the beamlet coordinate system 42 to the viewing zone coordinate system 40) may be stored in the memory 35, and the mapping engine 34 may selectively access one or more suitable mapping(s) therefrom. In various embodiments, the mapping engine 34 determines (e.g., accesses) the mapping(s), and a beamlet-bundles identification module 38, to be described below, applies the mapping(s) to identify the bundle of beamlets that hit each viewing zone.

As described above, the mapping between the viewing zone coordinate system 40 and the beamlet coordinate system 42 may be pre-stored in the memory 35, or may be received into the memory 35 via the input node 17 at appropriate timings. For example, when the UI device 19 is used to specify the multiple viewing zones 18, the viewing zone coordinate system 40 used by the viewing zone specification application running on the UI device 19 may be used to generate a mapping, which may be received into the processor 20a together with the first and second attributes via the input node 17.

For each of multiple images generated from the multiple targeted advertising contents (associated with the multiple viewing zones by the zones-and-content association module 36), using the mapping (determined/identified/accessed/generated by the mapping engine 34), the processor 20a identifies a bundle of beamlets from each of the MV pixels directed to one viewing zone to form the image. In the processor 20a, a beamlet-bundles identification module 38 running a bundle identification application is responsible for applying the mapping to identify the multiple bundles 52a, 52b of beamlets directed to the multiple viewing zones 18a, 18b to form the multiple images, respectively (see the examples of FIGS. 9A, 9B and 9C, described above). Generally, the bundle identification application, for each of the images, identifies a bundle of beamlets that "hit" or "land" on/in the corresponding viewing zone to form the image.

Referring back to FIG. 1, in some embodiments, the first and second targeted advertising contents may be updated to generate an updated version of the first image 25a visible to the first viewer 16a, and likewise the second targeted advertising content associated with the second viewing zone 18b may be updated to generate an updated version of the second image 25b visible to the second viewer 16b. For example, the first sensor 13a may sense that the first viewer 16a is moving from a first position to a second position relative to the first MV display 11a. Then the system controller processor 20a controls the first MV display 11a to project the updated version of the first image 25a to the first viewing zone 18a at the second position, after projecting the original first image 25a to the first viewing zone 18a at the second position. Alternatively, when the sensor 13a detects a new state of the first viewer 16a (e.g., the first viewer requesting certain information using his/her surrogate device), the MV display 11a may be controlled to project the updated version of the first image 25a to the first viewing zone 18a that may remain at the same position. Thus, the first MV display 11a is capable of projecting changing images to each of the first viewer 16a and the second viewer 16b in addition to being capable of projecting different images to the first and second viewers 16a and 16b, respectively.

An individual who continuously looks at an MV display 12 while wandering through its various viewing zones will see a new (different) content whenever crossing into a new viewing zone. The content shown in each viewing zone can be customized—even to the point of continually reconfiguring the viewing zones, and continually reassigning the content. This means a viewing zone may be constantly adjusted so it follows an individual walking past an MV display, allowing that individual to see content intended for him/her when crossing the paths of other people looking at the same time at the same MV display. Meanwhile, these other people may be watching their own customized content.

FIG. 1 illustrates some examples of targeted advertising that can be realized using the MV advertising system 10 according to various embodiments. Due to the nature of MV displays, different targeted advertising contents can be simultaneously displayed at different viewing zones by the same MV display when different shopping scenarios (e.g., different shoppers with different preferences or characteristics) are happening simultaneously. The ability to target different advertising contents from the same MV display simultaneously is one of key benefits of the present disclosure.

In FIG. 1, within view of the first MV display 11a ("MV display 1") located, for example, near an entrance of a shopping mall, the first and second viewers 16a and 16b may be detected, for example, by the sensor 13a ("Sensor 1") placed near MV display 1. Not only the presence but other attributes (e.g., the viewer's demographic information, purchase history, etc.) of the viewers 16a/16b may be sensed and inputted to the MV advertising system 10. As described above, the MV advertising system 10 defines the first and second viewing zones 18a and 18b located relative to MV display 1, and controls MV display 1 to generate the first image 25a based on the first targeted advertising content to be viewed by the first viewer 16a at the first viewing zone 25a. In the illustrated example, the first viewer 16a is detected as a female (the first attribute) so the first image 25a reads "Customer 1! Shop Women's New Arrivals at Store 1" based on the first targeted advertising content selected based on this attribute. When further attributes are known, such as the identity/name of the first viewer 16a (e.g., "Emily"), the first image 25a may be further refined/targeted to read, for example, "Emily! Shop Women's New Arrivals (in Petite) at Store 1." The second viewer 16b is detected as a customer who may be interested in massage equipment (the second attribute) based, for example, on the customer's purchase history at a massaging service store in the shopping mall, on the customer's user input via his/her surrogate device 17 ("I need a massage . . . "), or on that the customer has been previously observed as looking at massage equipment at a store. The second image 25b reads "Customer 2! Household Items on Sale at Store 2," which carries various massage equipment, based on the second targeted advertising content selected based on this attribute.

The first viewer 16a, who is shown the first message 25a, is directed to visit Store 1 to check out women's apparel. In the illustrated example, the second MV display 11b ("MV display 2") is located in Store 2, and a sensor 13b ("Sensor 2") may be additionally located in Store 2. In some embodiments, the MV advertising system 10, using the sensing system 24 including the sensors 13a/13b, may thus be able to follow the first viewer 16a as she moves from within view of MV display 1 to within view of MV display 2. Based on one or more attributes of the first viewer 16a or of the third viewing zone 18c where the first viewer 16a is at in Store 1, the third image 25c is created to read "Customer 1 ("Emily")! New Dress $xxx" with an image of the actual dress that is recommended to meet the first viewer's preferences. That is, the third image 25c is generated based on the third targeted advertising content selected based on the one or more attributes of the first viewer 16a or of the third viewing zone 18c, and shown to the first viewer 16a at the third viewing zone 18c.

In the illustrated example, the sensor 13b also detects a third viewer 16c at a fourth viewing zone 18d relative to MV display 2. The MV advertising system 10 receives not only an attribute of the third viewer 16c (e.g., female) or of the fourth viewing zone 18d, but also a composite attribute indicating that the third viewer 16c is a friend of the first viewer 16a. The system controller 20 thus selects a fourth targeted advertising content based on the received attributes including the composite attribute to generate the fourth image 25d that reads "Customer 1's ("Emily's") Friend! This hat goes great with the dress that she (Emily) is looking at!" with an image of the recommended hat and the hat's price. The fourth targeted advertising content is selected to increase or maximize the total sales in a group shopping setting as perceived by the MV advertising system 10.

The second viewer 16b directed to Store 2 to check out massage equipment is detected or located at a fifth viewing zone 18e by a sensor 13c associated with the third MV display 11c ("MV display 3") in Store 2. There, the second viewer 16b is shown the fifth image 25e that reads "Customer 2! Try our full-body massage chair $0000" with a composite image of a cartoon character who looks like the second viewer 16b enjoying the recommended full-body massage chair.

The sensor 13c at Store 2 may also sense a fourth viewer 16d at a sixth viewing zone 18f. The one or more attributes associated with the fourth viewer 16d or of the sixth viewing zone 18f (e.g., proximity of the sixth viewing zone 18f to massage equipment for sale) may indicate that the fourth viewer 16d too is interested in purchasing massage equipment. The MV advertising system 10, which is encouraging the second viewer 16b, based on the fifth image 25e, to test the only full-body massage chair available for sale in Store 2, determines to divert the fourth viewer 16d from the full-body massage chair so as not to disturb the second viewer 16b. That is, the MV advertising system 10 receives a composite attribute which indicates that multiple viewers are interested in a limited number of products available for sale. The MV advertising system 10 thus determines to generate the sixth image 25f that reads "Customer 3! Try our fabulous foot massager $ yyy" with a composite image of a cartoon character who looks like the fourth viewer 16d enjoying the foot massager. That is, the sixth image 25f is generated from the sixth targeted advertising content that is selected based on attributes including the composite attribute, wherein the composite attribute is configured to disperse the second and fourth viewers 16b and 16d, both interested in massage equipment, to test out different massage equipment in order to increase or maximize the total sales between the second and fourth viewers 16b and 16d.

MV Advertising Marketplace

In many cases, the owner of an MV advertising system may wish to offer the ability for others to run advertisements on their MV display infrastructure. A further embodiment of the present disclosure supports a marketplace where the ability to show targeted advertisements on an MV display is offered (e.g., sold) to prospective advertisers.

A marketplace for targeted advertising is created by specifying and offering (e.g., selling) attributes, which may represent opportunities for targeted advertising. For example, an advertiser may wish to show an ad to young female customers that are in proximity of a clothing store that carries the advertiser's clothing brand. Such an advertiser may wish to buy the attributes (e.g., female, ages 15-25, 4 pm-8 pm, within 15 yards of the clothing store) that will result in showing an ad when this scenario (i.e., the combination of the attributes) is detected. Other advertisers may also wish to purchase at least partially overlapping attributes. For example, a different advertiser may wish to show an ad to anyone in view for pretzels which are available nearby and may wish to purchase the attributes to that end (e.g., 11 am-8 pm, within 30 yards of the pretzel store). Note that because the MV display is capable of showing different images to different viewers in different viewing zones respectively and simultaneously, it may well be possible to accept those overlapping requests for the same attributes from different advertisers with respect to the single MV display. In some embodiments, different advertisers may bid for the attributes they desire in an auction format. In other embodiments, a price menu of various attributes available for purchase may be published to prospective advertisers, based on which they select and purchase the attributes they desire. For example, premium prices may be set for attributes that are considered conducive to high volume sales, such as female shoppers, weekends, MV displays located in areas with heavy foot traffic, etc. The MV advertising system controller 20 may receive these requests (e.g., bids, purchase orders based on a price) from the prospective advertisers and accommodates the requests, selectively accepting some requests, to maximize the profits for the owner of the MV advertising system. A display "owner" can be anyone that is able to offer advertising opportunities on an MV display.

Figure 10:
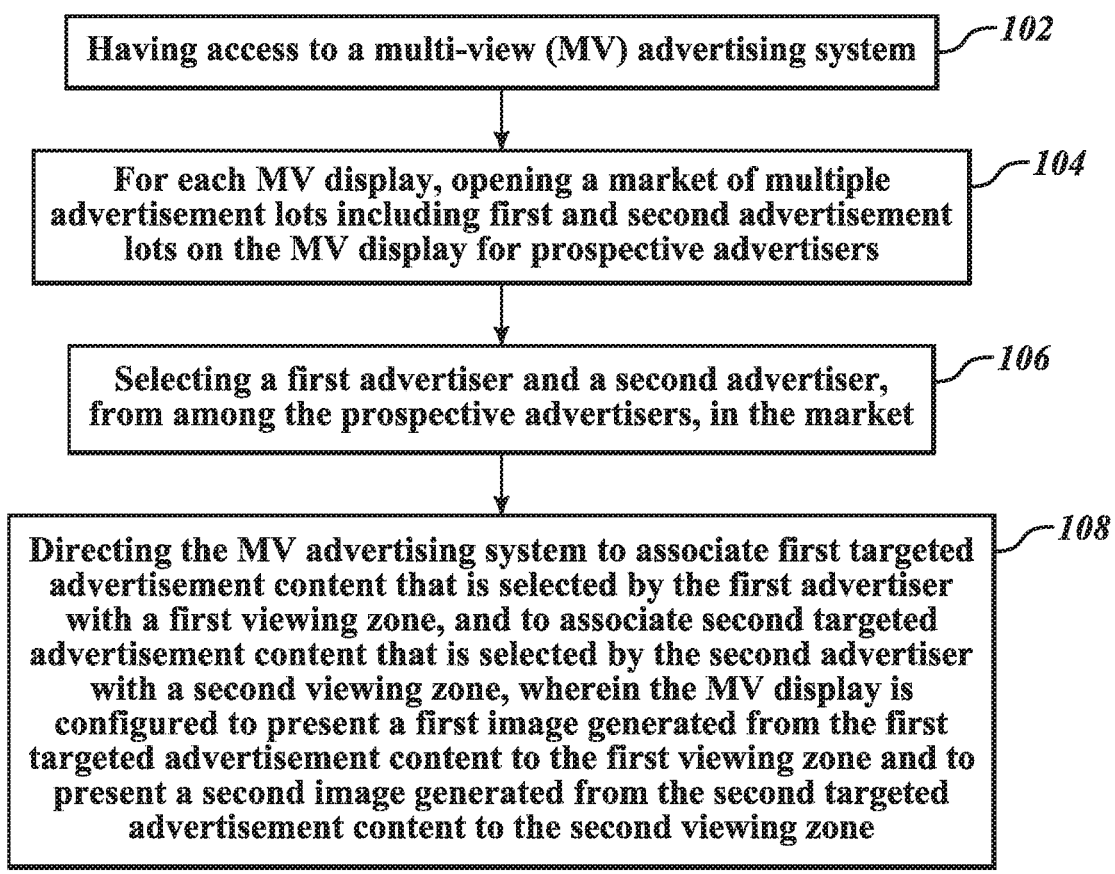
FIG. 10 is a flowchart depicting an embodiment of a computer-implemented method of supporting a multi-view (MV) advertising marketplace.

According to the further embodiments, a computer-implemented method of supporting a multi-view (MV) advertising marketplace is provided. FIG. 10 is a flow chart of one embodiment of the computer-implemented method of supporting a MV advertising marketplace. The method includes generally four steps. First, in step 102, access to an MV advertising system 10 as described above is provided. In various embodiments, it is envisioned that the method is implemented by the owner of an MV advertising system having access thereto. In various embodiments, the method is implemented by the system controller 20 of the MV advertising system 10 or by a controller/processor communicable with the MV advertising system 10.

In the second step of the computer-implemented method of supporting an MV advertising marketplace, in step 104 of FIG. 10, for each MV display of the MV advertising system 10, a market is opened to offer multiple advertisement lots including first and second advertisement lots on the MV display to prospective advertisers. In various embodiments, the market is opened online on a network accessible by prospective advertisers at remote locations, at different times, etc., to place purchase orders or bids for one or more attributes that they wish to purchase. That is, the multiple advertisement lots defined by attributes may be auctioned to the prospective advertisers, or an advertisement price menu may be published to the prospective advertisers, wherein the menu defines prices of the multiple advertisement lots based on attributes. In an auction model, the highest bidders of attributes typically win and block other advertisers from purchasing those attributes. In view of the capability of the MV display to deliver different contents to different viewers simultaneously, however, the same attributes may be auctioned or sold to multiple advertisers in the MV advertising market place. In a price menu model also, the same attributes may be sold to multiple advertisers, without one advertiser necessarily blocking other advertisers who come later from purchasing those attributes. The multiple advertisement lots on each MV display may be defined by attributes such as, as non-limiting examples, a location of the MV display, resolution of the MV display, a visibility characteristic of the MV display (e.g., lighting conditions), timing of advertisement on the MV display (e.g., busy shopping time), products/services to be advertised, a viewer attribute (e.g., young female shoppers), an attribute of a group of viewers, a composite attribute that is symbiotically derived from the first and second attributes, a viewing zone attribute (e.g., heavy foot traffic area), an attribute of a group of viewing zones, advertisers' characteristics, advertisers' preferences, a crowd size/flow related attribute, pricing related attribute, timing attribute, an environmental attribute, a content related attribute (e.g., adult content), a content scaling/cropping attribute (to fit the MV display), etc.

Thus, opening the market to offer multiple advertisement lots on each MV display for advertising involves making and publishing a list of attributes that can be purchased by prospective advertisers. The list of attributes may be updated in real-time to reflect information on people within view of the MV display, and the updated attribute list may be presented to prospective purchasers in real-time. The owner of the MV display need not "publish" information on every viewer at all times. For example, in some cases, an owner may wish to provide their own targeted advertising contents to specific viewers for some of the time, and only make the excess advertisement lots available to other advertisers.

The list of attributes offered to prospective advertisers may include restrictions on the type of advertising that may be acceptable. For example, an establishment may not wish to accept ads for competitive products or services. It also may disallow adult-oriented content. Both "white" and "black" lists are possible. A white list indicates types of content attributes which define the only types of content that are allowed. A black list indicates types of content attributes which define content that are disallowed.

In some embodiments, the prospective advertisers that may be invited to the market (e.g., to participate in an auction or to receive an advertisement price menu) may be identified based on attributes such as: a location of the MV display, resolution of the MV display (e.g., the higher resolution offered only to premium advertisers), a visibility characteristic of the MV display, timing of advertisement on the MV display, products/services to be advertised, a viewer attribute, an attribute of a group of viewers, a composite attribute that is symbiotically derived from the first and second attributes, a viewing zone attribute, an attribute of a group of viewing zones, advertisers' characteristics, advertisers' preferences, a crowd size/flow related attribute, pricing related attribute, timing attribute, an environmental attribute, a content related attribute, a content scaling/cropping attribute, etc. In some embodiments, a subscription model may be adopted in which potential advertisers can subscribe to purchasing certain types of attributes or accessing sensed data collected by the MV advertising system 10.

As described above, the MV display is capable of projecting multiple images of the same size as the MV display itself to different viewing zones relative to the MV display simultaneously. Thus, each advertisement lot offered in the market to the prospective advertisers is coextensive with an area of the MV display, and the first advertisement lot on the MV display is to project the first image based on the first targeted advertising content to the first viewer at the first viewing zone, and the second advertisement lot on the MV display is to project the second image based on the second targeted advertising content to the second viewer at the second viewing zone.

It should be noted that the market may be opened (e.g., auctioning bids received or purchase orders based on a menu received) either after or before the input node 17 of the MV advertising system 10 receives the first and second attributes (e.g., detecting the presence of a young female shopper). For example, some advertisers may participate in the market to "pre-purchase" attributes such as [female, ages 15-25, 4 pm-8 pm, within 15 yards of the clothing store]; then, when the input node 17 receives the pre-purchased attributes, for example from the sensing system 24 detecting shoppers that satisfy these attributes during the time period pursuant to an internal clock, the advertisement lot defined by the pre-purchased attributes may be sold or given to the pre-purchasing advertiser without further intervention by the advertiser. As another example, the market may be opened after the attributes [female, ages 15-25, 4 pm-8 pm, within 15 yards of the clothing store] are received into the MV advertising system 10. In this example, receipt of the attributes into the MV advertising system 10 triggers opening of the market to the prospective purchasers.

In the third step of the computer-implemented method of supporting an MV advertising marketplace, in step 106 of FIG. 10, a first advertiser and a second advertiser, from among the prospective advertisers, are selected in the market. For example, in an auction embodiment, the highest bidding advertisers may be selected. In another example of a price menu embodiment, any advertisers who place purchase orders pursuant to the menu may be selected until the available attributes are sold out. For the purpose of ease of attribute-searching and selection of the first and second advertisers, attributes can be organized in a standard format to make it easier to algorithmically search for matches. XML or other standard data formats can be used for this purpose.

In the fourth step of the computer-implemented method of supporting an MV advertising marketplace, in step 108 of FIG. 10, the system controller 20 of the MV advertising system 10 associates the first targeted advertising content that is selected by the first advertiser with the first viewing zone, and associates the second targeted advertising content that is selected by the second advertiser with the second viewing zone. As a result, the MV display will present a first image generated from the first targeted advertising content selected by the first advertiser to the first viewing zone, and present a second image generated from the second targeted advertising content selected by the second advertiser to the second viewing zone.

In some embodiments, the first targeted advertising content is selected based on the first attribute that is selected by the first advertiser, and the second targeted advertising content is selected based on the second attribute that is selected by the second advertiser. For example, when the first advertiser selects an attribute "female shopper," which is received as the first attribute into the MV advertising system 10 (e.g., by the sensing system 24 detecting a female shopper in the store), the first targeted advertising content is selected based on the "female shopper" attribute, i.e., as advertising content targeted to female shoppers. As another example, when the second advertiser selects an attribute "temperature above 85° F.," which is received as the second attribute into the MV advertising system 10 (e.g., by the sensing system 24 detecting a temperature of 90° F.), the second targeted advertising content is selected based on the "temperature above 85° F." attribute, i.e., as advertising content targeted to shoppers experiencing a high-temperature environment.

It should be noted that the first and second attributes may be selected by the first and second advertisers either prior to, or after, the input node 17 of the MV advertising system 10 receives the first and second attributes. For example, the first and second advertisers may "pre-select" or pre-purchase the first and second attributes, such that the MV advertising system 10, upon receiving the pre-selected attributes immediately associates the first targeted advertising content of the first advertiser with the first viewing zone and associates the second targeted advertising content of the second advertiser with the second viewing zone. In another example, the market is opened only after the MV advertising system 10 receives the first and second attributes, for example, to seek bids from prospective advertisers that may be interested in these attributes detected in real-time, and the first and second advertisers may select (e.g., purchase, bid) the first and second attributes offered in the market.

MV ADVERTISING EXAMPLES

By way of non-limiting examples, various scenarios, implementations or applications of the MV advertising system of the present disclosure are provided below.

Example 1-1

Proximity to a Product

A multi-view (MV) display is positioned above a number of products. Each customer sees information that explains the particular product they are standing in front of.

MV advertising systems can be used to show differentiated content to specific viewing zones regardless of who is occupying those zones. For the purpose of advertising, this might mean creating location-specific marketing messages that can each be assigned to one of the numerous viewing zones created for an MV display.

Example 1-2

Proximity to a Store

For instance, an MV display at a shopping mall might advertise the contents of one of the many shops in its vicinity depending on the proximity of each individual to each store. People strolling near the shoe store would see a message about sneakers on the MV display, and people passing the hat store would see a message about berets on the same MV display.

Example 2

Distance from a Sign

Viewers are detected at different distances to a sign. Viewers far away are shown a graphic meant to entice them to come closer, while viewers who are nearby are offered product details, for example.

Example 3

Advertising Based on Demographic

The sensing system is able to determine an approximate age of the various people within view of a multi-view display. Different ads are shown based on the presumed age of the viewers.

Example 4

Advertising Based on Behavior

A customer lingers in front of a product. In this case, the targeted advertising content shown over time builds a case for purchasing the product.

Example 5

Advertising Based on Preferences

The sensor system detects customers in view who have strong feelings about the environment. They are shown ads promoting the sustainability of particular products.

MV advertising systems can track an individual and continually surround them with their own viewing zone, in which case the version of content shown in that viewing zone may be specific to that person's preferences, and not necessarily to the area they are occupying. As long as they are in sight of the MV display, they will be able to see their custom messaging.

Someone looking for shoes would continually see messages about shoes on an MV display even though they are strolling by pet stores and dress stores. For instance, the sensors might detect the same woman walking into a couple of luggage stores, and then continually track her location in a shopping mall, establish a dedicated viewing zone around her every time she is near an MV display, and show luggage-specific content to these viewing zones. Other individuals within sight of the MV displays would occupy their own viewing zones and see content specific to their preferences or requests.

Example 6

Advertising Based on Purchase History

A customer is detected who regularly purchases razor blades, and appears due for another purchase. The system displays an ad for higher end razor blades, along with a one-time discount.

Illustrative MV Advertising Examples: A —B4-1

By way of non-limiting examples, the following provides various scenarios, implementations or applications of the MV advertising system of the present disclosure.

A—Location-Specific Advertising

There are many situations in retail and other public environments in which content on an advertising display, marque, or other form of signage is more powerful if it plays off its immediate surroundings. On the other hand, it may be desired to show a variety or range of content on the same display, and a logical or convenient way to sort the content is by where a person is situated when looking at the display. Using the MV advertising system, a person walking by an MV display might see five different ads, because the ads change depending on the distance of the person to the MV display. The ads might be adjusted for readability at their varying distances, but not necessarily changed to reflect the context of their immediate surroundings.

Example A-1

At a Trade Show, the tables and booths of numerous vendors are within sight of a large multi-view display. Viewing zones are created around each vendor, and versions of content pertaining to each vendor are assigned to the matching viewing zone. As attendees wander in the viewing area of the MV display, they can see on the MV display information pertaining to the closest vendor. Numerous attendees can all simultaneously look at the same MV display, but each will only see content relating to their nearest vendor.

In common areas that are not immediately adjacent to any vendors, other viewing zones are created that have versions of content such as "Welcome," or directions to restrooms or food services or exits or other vendor areas. Additional versions of content (or targeted advertising contents) are advertisements sponsored by vendors to give them extra exposure. So, attendees milling in a common area might find themselves in a viewing zone with a version of content that promotes a vendor in a different building. Anyone passing through any of these viewing zones would see on the MV display the version of content assigned to that zone, even though other people simultaneously see other versions of content on the same MV display. Each version of contact is distinct, without overlapping what other people are seeing.

Example A-2

At a Computer Store, each computer model is sitting on a long display table. A large multi-view display dominates the room. Viewing zones are created around the area occupied by shoppers looking at a given model. Versions of content are created specific to each model, and assigned to the viewing zone around the model. So, when a shopper is inspecting a computer, they can look at the MV display and see advertising that relates to the very computer in front of them. Many shoppers can all look at the same time at the same MV display and each see only content that pertains to their computer, without seeing the versions of content visible to other shoppers.

Shoppers may also have the option to access additional layers of content in case they have more questions. For instance, there might be multiple viewing zones in front of each computer, and a consumer only needs to shift their head or reposition themselves a bit to place themselves in another viewing zone and see another version of content. So, by standing directly in front of a computer they see price information; by tilting their head to the right, or shifting slightly to the right, they see specifications on the computer; and by moving slightly to the left they see recommended accessories for that computer.

Additional layers of content might also be accessed by other means. A shopper might touch a button on the table, or a key or screen icon on the computer, to switch the version of content visible from their viewing zone. A switch of content might also be triggered by the shopper using their cell phone, or some other means. Or, it might be triggered by a salesperson, or a remote operator observing the shopping area.

Changes in the version of content shown to a specific viewing zone might also be triggered by information received by sensors and provided to the MV advertising system controller. These sensors might look for a conscious gesture by a shopper, or by non-conscious behaviors. For example, shoppers may know, or be instructed, that by raising their hand or holding up a certain number of fingers they can access additional versions of content on the nearest MV display. Or, the system may scroll through content when sensors detect a shopper has been at the same location a long time. Or maybe the sensors track which computers a shopper has looked at and creates a version of content for the shopper that compares the other models with the one they are currently inspecting.

In common areas, away from the display tables, viewing zones might be created in which shoppers see versions of content sponsored by manufacturers or distributors. So, in areas between tables, shoppers might see on the MV display advertisements for the latest models, or features by a certain computer maker, and so forth.

Similarly, the content available to be seen when a shopper is standing by each computer may be based on tiered pricing charged to the manufacturer or distributor as prospective advertisers. Simple information may be charged at a lower rate, with more elaborate versions of content charged at higher prices. Provision of various advertising opportunities on an MV display at varying prices to prospective advertisers will be described in detail below.

Example A-3

A huge multi-view billboard overlooks a crowded city boulevard. Tens of thousands of people a day, including pedestrians and motorists, are exposed to the content on the MV billboard. The areas from which the MV billboard may be seen are divided into viewing zones, each with its own assigned version of content. The owner or operator of the billboard rents advertising time for each of the viewing zones. Perhaps shop and restaurant owners seek to rent the viewing zones in front of their business so passersby will be prompted by the billboard to visit them. A pedestrian in front of the theater might see a movie ad, while pedestrians in front of an Italian restaurant see the day's specials. Maybe Joe's barbershop buys the version of content viewable in front of Sam's barbershop to encourage people to get their haircut at Joe's around the corner rather than at Sam's.

MV system capabilities allow the content to not only be rented by time, but by the location of the people looking at the billboard. Perhaps one small viewing area is reserved for people wanting to make a big show for a private moment. So, someone wanting to make a proposal, or offer birthday or anniversary wishes, or a welcome statement, or congratulations, might rent for a ten minute period the viewing zone on a certain spot within the viewing area of the MV billboard. During that time, and from that spot, anyone looking at the billboard will see the special message.

Yet other viewing zones might be configured on the street itself, to deliver differentiated content to motorists and their passengers, or cyclists, or riders on mass transit.

Sensors might be used to further refine the configuration of viewing zones, the versions of content seen in the viewing zones, and the amount of money charged to advertisers.

For instance, sensors might measure the flow of people through a specific viewing zone and send this input to the MV advertising system controller which then changes the message and the price charged to the advertiser renting the zone. Some messages may be dependent on crowd size. Some advertisers may only wish to rent a zone during certain usage profiles. Pricing models may be based on the number of eyes able to see the sign, which could be calculated by sensors reporting crowd flow to the MV advertising system controller.

Example A-4

A large, elevated multi-view marque for a business presents different imagery, messaging, and other versions of content to different viewing zones in the area. Motorists on a nearby freeway see a succession of images as they get closer to the MV marque. The same MV marque is used to show another targeted advertising content to pedestrians in the neighborhood, and to show yet another targeted advertising content to anyone in the parking lot or approaching the business entrance.

Depending on their proximity to the business, viewers looking at the MV marque see something different. This allows the business to better target its messaging to the types of audiences likely to occupy the MV marque's various viewing zones.

It may also be the case that occupants of some areas in the vicinity of the MV marque object to its appearance or messaging. For instance, a nearby residential area may consider the MV marque to be a visual intrusion that detracts from the neighborhood's quaint charm. To remedy this, a viewing zone is created for residences around the MV marque, and no content at all is visible to anyone looking at it from this viewing zone.

Perhaps there is also a pre-school that objects to the content of the sign. To address this, a viewing zone is created around the school and a version of content is created for it that is suitable for children.

Example A-5

There are other situations where location might dictate the version of targeted advertising content shown to that location. For instance, viewing zones might be set in vertical layers so people whose eyes are at different heights see different forms of content. This might be useful for showing differentiated content to children, or people in wheelchairs, or seated people, as opposed to most standing adults, as examples. To do this, the viewing zones for an MV camera would be established for envelopes/volumes that include top and bottom heights, as well as a footprint. In a given footprint, there might be multiple layers of viewing zones so an inquisitive person standing in the same spot but changing heights by crouching or standing or jumping would enter different viewing zones and therefore see different versions of content. This technique would allow a child and adult occupying the same space to each see a different version of advertising content.

This might be useful in a fast-food restaurant with an MV menu board that advertises different products to patrons seated at their tables as opposed to patrons on their feet, as an example.

A1—Dynamic Environment Advertising

Another category in which advertising content is based on viewing zone (location) rather than on individuals, includes cases where the MV system gathers dynamic data about the environment (surroundings) and uses this information to configure viewing zones and the versions of content viewable in those zones. This is in contrast with the MV advertising system looking for information about the viewers themselves—the people in range of the MV display.

Dynamic Environment Advertising is relevant when variables about the place, and not the people, are used to determine which versions of content are shown on an MV display.

For instance, there may be changing environmental conditions that affect the visibility of advertising messages, in which case sensors or other techniques can be used to ensure content is visible in spots affected by the sun, shadows, reflections, or artificial lighting. In these situations, sensors can relay to the MV advertising system controller the lighting conditions for the total viewing area of an MV display (all the places from which the MV display may be seen), and the controller can then create viewing zones to match each lighting condition and select or create a version of advertising content suitable for that condition.

The MV advertising system might also look at other environmental dynamics, such as weather, time, seasonality, traffic, special events, and so forth.

For someone wanting to buy advertising time on an MV display, these environmental characteristics might determine how much is charged. They might also inform an advertiser about the suitability of conditions for their messaging. A sunscreen ad might be more impactful on the sunny side of the street, but a travel ad for Hawaii might be extra persuasive on the shady side of the street.

These same two conditions—sun and shade—might also affect which version of content is selected for a viewing zone based on the content's readability in bright vs. dark surroundings.

The ability to parse advertising to various environments within sight of a single MV display affords great specificity and control in renting out an MV display sign among numerous advertisers, and in maximizing the effectiveness, usefulness, and readability of the messaging.

Example A1-1

An MV display is integrated into a building facade on a famous city street. The sign attracts many eyes from many locations on the street. Rather than send the same advertising content to every location, multiple viewing zones are created that cater to the varying environmental conditions from which the MV display can be seen. Advertisers might find that certain environmental conditions affect the impact of their messaging, and are willing to pay more to have their content shown to the right place under the right conditions. Sales of these locations and conditions might be conducted in any of a number of ways, such as an online auction, per a menu pricing scheme, and so forth.

For instance, a certain portion of the sidewalk might become extremely crowded at times, precluding a clear view of the MV display. National advertisers may not want to pay for this time. However, the shop and restaurant owners on this stretch may be very anxious to encourage people in the crowd to step into their establishment, off the busy city street. Even if it is harder for people to read the sign at these times, it is a very targeted audience for the right advertiser.

Other segments of the MV display's viewing area might be affected by a range of sights, sounds, and smells; exposure to weather; lighting conditions; and so forth, that are believed to affect the value of the advertising message directed to these areas. By parsing these areas, measuring their environmental variables, and adjusting viewing areas and advertising content accordingly, the operators of the MV display can deliver and receive more value for the advertisement lots on the MV display.

B—Person-Specific Advertising

An especially powerful form of advertising allows a message to be crafted to each individual viewing it, as opposed to advertising that broadcasts the same message to everyone in sight. The advertising will be even more effective if it is based on the needs and behaviors of the individual at the actual time the message is viewed, rather than on a static profile of the person.

Any information an advertiser can use to understand the individual receiving a message, the more effective the messaging can be, and the more valuable it becomes. MV advertising systems can select or create advertising messages suited to a specific individual, while simultaneously doing the same for other individuals looking at the same MV display. Advertisers can be charged for accessing individuals in their target market, leaving the remaining individuals available for other advertisers.

A family film distributor may only want to advertise to children, while a cosmetics company may only want to advertise to women, and a shaving cream company may only want to advertise to men. Each of these advertisers can simultaneously deliver their message to their audience on an MV display, without suffering loss from having non-preferred audiences seeing other messages. This example allows a triple revenue stream, and triple the targeted messaging, on the same MV display.

There are a number of ways an MV advertising system can collect information on an individual in order to select or create content for them, and to then deliver the content to a location where the person can view it. Four exemplary categories are described below.

B1—Self-Identified Viewer Advertising (for Actual and Alias Identities

Advertising delivered by an MV advertising system can be especially effective when a viewer identifies their immediate consumer needs and interests. For example, a shopper might check in at a mall and report they are looking for shoes. Based on this, the advertising shown to the individual would logically focus on shoes. If an individual also provides their identity or profile, a larger pool of data can be accessed and analyzed to further refine the marketing messages delivered to them. Maybe brand preferences can be determined, or perhaps there are patterns of other products or services the person buys when in the market for shoes.

An individual might identify themselves to an MV advertising system in many different ways. They might check-in at a kiosk; on a cell phone or other surrogate device; on a laptop or desktop from home, work, school; and so forth. Perhaps they are instructed to give certain gestures to inform the system what they want. A mall directory might indicate that three fingers held over the head informs the MV adverting system an individual is shopping for cookware. Subsequently, sensors or other techniques might track the individual on their visit to the mall, and deliver customized cookware content to them on every MV display they encounter.

There are many existing techniques for tracking individuals, and more are on the way. Individuals might simply be identified as a "moving blob" interested in cookware, and identifying and predictive techniques can be used to track the blob from one location to the next. This might be done with sensors that convey information to a system controller, which then creates a viewing zone around the blob and selects (or creates) and delivers to that viewing zone a version of content customized to the blob.

Some of the tracking techniques might be based on features of the blob—its face, dress, accoutrements, companions. Predictive techniques might be used as well—continuation of its trajectory, or patterns other blobs in the past have exhibited that possess similar characteristics to the blob being tracked.

Tracking might also be performed with the aid of the individual. They might wear a sticker with a quick-read code, or have a wearable containing a tracking technology. They might be tracked through their cell phone, or any combination of many other techniques.

The use of a shopper card, loyalty card, credit card, or business card might also help inform the MV system of an individual's identity and preferences.

Example B1-1

A woman visits a shopping mall with the intent of buying a tennis racquet. She stops at the mall directory and is presented with several options for making her buying intent known: she can enter "tennis racquet" on a screen located at the directory; or, she can make a gesture similar to a tennis ball serve; or, she can use an app on her cell phone; or she can touch the phrase "Tennis Racquet" on a mall directory sign. Other options may be offered as well.

Sensors at the kiosk collect visual information about the women so she can be tracked throughout the mall. The information is relayed to the MV advertising system controller which matches her identifying features with her desire to find a tennis racquet. Sensors relay to the controller her facial characteristics, analyze her overall volume, record her clothing color and styles, her hair mass, and so forth, all with the intent of tracking her as the distinct individual looking for a tennis racquet.

The woman chooses to not identify herself or use her shopper card which would allow the MV advertising system to access information about her past trips to the mall, and to access other data bases that might contribute to understanding her preferences and behaviors. These processes would have taken place via the MV advertising system controller which would search the mall's records as well as information, reports, and databases available online. Nor does the woman choose to allow the system to track her by her phone, or by using one of the bracelets, pins, lanyards, or other wearables that contain tracking devices and are available at the directory location (an alarm at the mall's exits reminds shoppers to deposit these tracking devices at a nearby receptacle when leaving).

As the woman progresses through the mall she encounters multi-view displays that present her with advertising content relating to tennis racquets, while simultaneously presenting other advertising content to other individuals. The MV displays direct her to the shops that offer racquets, give distances to the shops, inform her about sales and discounts, advertise the newest models endorsed by the biggest stars, and so forth.

The mall provides a base amount of information without directly charging the stores, but more persuasive versions of content might cost extra. Racquet manufacturers and distributors might also have the opportunity to pay for targeted advertising. There might be a bounty system, whereby stores or manufacturers are charged when a targeted shopper follows up by buying the product shown on an MV display.

The content shown to the shopper is continually revised based on her behavior. Once she has visited a store, content about that store is no longer shown. After she has made a purchase, the controller determines other types of purchases she may be receptive to making, and appropriate versions of content are then shown to her.

At any time, the woman can correct or adjust the content shown to her through the same sorts of techniques she used when first arriving at the mall. She may even be able to opt out of the system, in which case she will only be shown non-individualized content on the MV displays.

In all cases, sensors detect the woman's location and relay this information to the system controller; the controller creates a viewing zone around the woman for each MV display she encounters, and continually readjusts the viewing zone as she moves; the controller accesses information about the woman to select or create a version of content customized for her; the customized version of content is assigned to the viewing zone around the woman. The controller also analyzes and records for future use the woman's movements and behaviors, and what content has already been showed to her. If she immediately buys tennis shoes and socks after buying a tennis racquet, this information will be stored with the controller and may affect what is shown to other women shopping for tennis racquets, especially if they bear similar characteristics to this particular woman.

B2—System-Identified Viewer Advertising (the MV System Determines a Viewer's Identity)

Often it will be desired to identify a person and deliver customized content to them even though they have not volunteered any information about themselves. There are many techniques for characterizing a "blob" and predicting what sort of advertising content will be most relevant, useful, and persuasive.

Example B2-1

A man enters a shopping mall looking for a tie. He does not identify himself and does not seek any help in his search. None-the-less, the MV advertising system uses sensors located throughout the mall to identify him as a blob with distinct, trackable characteristics. After he has made a number of stops at different locations to examine ties, an algorithm in the MV system controller interprets his behavior and a distinct version of content is selected or created to advise him about locations in the mall that offer ties. The system continues to track and observe him to add more information to be analyzed. What stores and brands does he prefer? Is he leaning toward particular color combinations? The system might also match his behavior to previous observed shoppers to see if he can be identified, or at least placed within a classification of men shopping for a specific type of tie. As the man proceeds with his shopping, the content shown to him on MV displays is continually refined. This information is also collected for use in future analysis and profiling of shoppers.

The MV advertising system analyzing the man's shopping behaviors may also feature a self-learning capability that experiments with incremental changes to its algorithms to measure their respective predictive capabilities and impact on consumer behaviors. Similarly, incremental changes are made to the content shown to shoppers. These experiments can be normalized for types of shoppers and other variables. Improved assumptions are then adopted to make the system more effective.

When a certain tie from store x is shown to the man and he subsequently buys the tie, the information is presented to store x so they know their contribution to paying for the system is providing them with results.

B3—Behavior-Driven Advertising

MV advertising systems can use sensors and other techniques to observe an individual's behaviors and relay these to a controller for analysis of what version of content should be shown to the individual. Or, the behaviors might be observed by, or relayed to, a live person—such as a salesperson—who then determines the appropriate version of content.

Example B3-1

A selection of smartphones is on display in proximity to an MV display. Each person approaching the display is contained within a viewing zone, allowing the MV advertising system to simultaneously provide a different version of content to each shopper.

Sensors and other techniques are used to collect each individual's conscious behaviors—such as which phones they touch or inspect, how much time they spend with each phone, and their sequence of going from one phone to the other.

Sensors and other techniques also collect unconscious behaviors—for example, facial recognition is used to record each individual's expressions. Biometric sensors track body heat, heart rate, retinal focus, and other indicators.

Sensor data might also be used to determine if some individuals are part of a group, and how the group dynamics seem to be working.

These inputs are directed to the MV advertising system controller which runs them through an algorithm to determine the most effective forms of advertising for each individual or group. If the system is able to access an individual's actual identity, the controller accesses a much broader set of variables and attributes to further refine the advertising content for each person.

B4—Group Behavior-Driven Advertising

The ability to simultaneously deliver differentiated content to individuals in close proximity to each other opens the possibility of advertising that plays off group dynamics. For instance, an advertiser may not only wish to use different advertising strategies for each member of a couple; the advertiser may further aspire to give each of them a message that creates a desired dynamic between the two. These differentiated messages might lead to a group decision that is favorable to the advertiser, such as where the couple should go to purchase a meal; or it might lead to one member urging the other to make a decision desired by an advertiser, such as buying a suit at the advertiser's store. There are many possible permeations.

The MV display may cue one member of a couple to give the other a sign of affection, while suggesting to the second person that they should reward their affectionate partner with a visit to the jewelry store. Or, it might show the woman an image of a smartly dressed male model, while showing the man a smartly dressed male model being fawned over by beautiful women. Both will be inspired to buy the man a smart looking suit.

A group of teens, or a family unit, or a parent and child, or a couple of coworkers, or any other groupings, might all have dynamics that can be predicted by an advertiser and are therefore candidates for advertising that prompts a desired group behavior or group decision through individualized messaging.

In-so-far as these groups can be identified—or identify themselves—advertising can be selected, created, and sold based not only on the suitability of the group for specific types of products and services, but based on the ability to offer group behavioral techniques to more effectively create a desired outcome.

Example B4-1

A family walks by a time-share kiosk at a vacation resort. There is a large multi-view display in front of the kiosk which is viewable by the entire family as well as other people walking by. Sensors that feed to the MV advertising system controller detect the family size, composition, and other pertinent variables. The controller establishes a viewing zone around each member of the family from which they will only be able to see the version of content intended for them.

The versions of content might simply be based on the likely interests and concerns of each member of the family, to build their collective enthusiasm. The mom and dad might be shown activities that the time-share company knows are appealing to parents depending on their individual gender, physical-type, and other detectable traits. The same with the kids.

Another approach is to transform each family member into a time-share sales person. Each family member would receive their cue for giving a sales pitch to the family decision maker. The time-share company could apply its best learnings for how families are nudged into making a decision. The MV advertising system becomes a never-before available tool for persuading a group, based on the idea of separately influencing each member of the group.

A further enhancement is the ability of the MV advertising system to learn which versions of content, and which variables and algorithms, are most successful in driving a family to the sales kiosk and prompting an actual sale. To achieve this, the controller can be instructed to incrementally change specified variables within allowable limits. Sensors can then detect which settings most often prompt successful results.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A multi-view (MV) advertising system comprising:
    a multi-view (MV) display including two or more multi-view (MV) pixels, wherein each MV pixel is configured to emit beamlets in different directions to form different views of each MV pixel from the different directions, respectively, wherein the beamlets of each MV pixel are defined using a beamlet coordinate system configured for that MV pixel;
    an input node which, in operation, receives a first attribute of a first viewer or of a first viewing zone and a second attribute of a second viewer or of a second viewing zone;
    a system controller, coupled to the MV display and the input node, which, in operation,
    defines the first and second viewing zones located relative to the MV display in a viewing zone coordinate system;
    determines a mapping that translates between the viewing zone coordinate system, which is used to define the first viewing zone, and the two or more beamlet coordinate systems, which are respectively configured for the two or more MV pixels such that each beamlet coordinate system defines the beamlets from each MV pixel;
    associates a first targeted advertising content with the first viewing zone based at least on the first attribute and associates a second targeted advertising content with the second viewing zone based at least on the second attribute;
    for a first image generated from the first targeted advertising content, using the mapping, identifies a bundle of beamlets from the two or more MV pixels of the MV display directed to the first viewing zone to form the first image;
    for a second image generated from the second targeted advertising content, using the mapping, identifies a bundle of beamlets from the two or more MV pixels of the MV display directed to the second viewing zone to form the second image, wherein the bundle of beamlets directed to the first viewing zone to form the first image visible to the first viewer is different from the bundle of beamlets directed to the second viewing zone to form the second image visible to the second viewer; and
    outputs control signaling for the MV pixels, the control signaling defining color and brightness of each of the beamlets in each bundle to project the corresponding first or second image to the corresponding first or second viewing zone.

2. The MV advertising system of claim 1, wherein the image is selected from a group consisting of a static image, a video, a text pattern, and a lighting pattern.

3. The MV advertising system of claim 1, wherein the first attribute includes one or more of: a presence of the viewer, a location of the viewer, a characteristic of the location of the viewer, an aggregate characteristic of a group the viewer belongs to, an aggregate viewer response history, externally-observable characteristics of the viewer, an externally-observable behavior of the viewer, a path of travel followed by the viewer, a speed of the viewer, biometric information of the viewer, demographic information of the viewer, preferences of the viewer, identity of the viewer, information inputted by the viewer, purchase history of the viewer, a location of the viewing zone, an environmental condition of the viewing zone, and a characteristic of the viewing zone.

4. The MV advertising system of claim 1, comprising a user-interface device which, in operation, receives an operator specification of the first attribute.

5. The MV advertising system of claim 1, comprising a sensing system, coupled to the input node, which, in operation, detects the first attribute.

6. The MV advertising system of claim 5, comprising a first viewer surrogate associated with the first viewer and communicable with the sensing system.

7. The MV advertising system of claim 6, wherein the viewer surrogate is a smartphone, a personal computing device, or a radio tag readable by the sensing system.

8. The MV advertising system of claim 6, wherein the sensing system detects the first attribute based on the first viewer surrogate.

9. The MV advertising system of claim 6, wherein the viewer surrogate includes a user-interface, via which the first viewer inputs the first attribute, which is transmitted from the viewer surrogate to the sensing system.

10. The MV advertising system of claim 1, comprising one or more memory devices configured to store one or more of:
    contents, from which the system controller selects the first targeted advertising content,
    interfaces that feed content from content providers, and computer-executable algorithms, which the system controller uses to generate the first targeted advertising content.

11. The MV advertising system of claim 10, wherein the one or more memory devices, in operation, store a first set of attributes of the first viewer or of the first viewing zone, and the system controller, in operation, associates the first targeted advertising content with the first viewing zone based at least on the first attribute received via the input node and the first set of attributes stored in the one or more memory devices.

12. The MV advertising system of claim 11, wherein the first set of attributes includes one or more of: a location of the viewer, a characteristic of the location of the viewer, an aggregate characteristic of a group the viewer belongs to, an aggregate viewer response history, externally-observable characteristics of the viewer, an externally-observable behavior of the viewer, a path of travel followed by the viewer, a speed of the viewer, biometric information of the viewer, demographic information of the viewer, preferences of the viewer, identity of the viewer, information inputted by the viewer, purchase history of the viewer, a location of the viewing zone, an environmental condition of the viewing zone, and a characteristic of the viewing zone.

13. The MV advertising system of claim 1, wherein the first targeted advertising content is updated based on a third attribute of the first viewer or of the first viewing zone, received via the input node, to project an updated first image to the first viewer, which is different from the first image previously projected to the first viewer.

14. The MV advertising system of claim 1, comprising:
a second MV display including two or more MV pixels, wherein each MV pixel is configured to emit beamlets in different directions in a second beamlet coordinate system;
wherein
the input node, in operation, receives a third attribute of the first viewer or of a third viewing zone; and
the system controller, in operation:
defines the third viewing zone located relative to the second MV display in a second viewing zone coordinate system;
determines a second mapping that translates between the second viewing zone coordinate system and the second beamlet coordinate system;
associates a third targeted advertising content with the third viewing zone based at least on the first and third attributes;
for a third image generated from the third targeted advertising content, using the second mapping, identifies a bundle of beamlets from the two or more MV pixels of the second MV display directed to the third viewing zone to form the third image; and
outputs control signaling for the second MV display, the control signaling defining color and brightness of each of the beamlets in the bundle to project the third image to the third viewing zone.

15. The MV advertising system of claim 1, wherein the system controller associates the first and second targeted advertising contents with the first and second viewing zones, respectively, based at least on the first and second attributes and an external attribute, which impacts the association of both the first and second targeted advertising contents.

16. The MV advertising system of claim 15, wherein the external attribute is selected from a group consisting of a crowd size/flow related attribute, pricing related attribute, timing attribute, an environmental attribute, a content related attribute, and a content scaling/cropping attribute.

17. The MV advertising system of claim 1, wherein the system controller, in operation, associates the first and second targeted advertising contents with the first and second viewing zones, respectively, based at least on the first and second attributes and a composite attribute that is symbiotically derived from the first and second attributes.

18. The MV advertising system of claim 17, wherein the composite attribute indicates the first and second targeted advertising contents that are designed to facilitate collective purchase decisions by the first and second viewers in a group shopping setting.

19. The MV advertising system of claim 17, wherein the composite attribute indicates the first targeted advertising content of a first product for the first viewer to facilitate an individual purchase decision by the first viewer and the second targeted advertising content for the second viewer, which is different from the first targeted advertising content to divert the second viewer from the first product.

20. A computer-implemented method of supporting a multi-view (MV) advertising marketplace, the method comprising:
(a) having access to a multi-view (MV) advertising system including:
one or more multi-view (MV) displays, each including two or more multi-view (MV) pixels, wherein each MV pixel is configured to emit beamlets in different directions to form different views of each MV pixel from the different directions, respectively, wherein the beamlets of each MV pixel are defined using a beamlet coordinate system configured for that MV pixel,
an input node which, in operation, receives a first attribute of a first viewer or of a first viewing zone and a second attribute of a second viewer or of a second viewing zone;
a system controller, coupled to the MV display(s) and the input node, which, in operation, for each MV display,
defines the first and second viewing zones located relative to the MV display in a viewing zone coordinate system;
determines a mapping that translates between the viewing zone coordinate system, which is used to define the first and second viewing zones, and the two or more beamlet coordinate systems, which are respectively configured for the two or more MV pixels such that each beamlet coordinate system defines the beamlets from each MV pixel;
associates first and second targeted advertising contents with the first and second viewing zones, respectively, based at least on the first and second attributes;
for each of first and second images generated from the first and second targeted advertising contents, using the mapping, identifies a bundle of beamlets from the two or more MV pixels of the MV display directed to the first or second viewing zone to form the first or second image, wherein the bundle of beamlets directed to the first viewing zone to form the first image visible to the first viewer is different from the bundle of beamlets directed to the second viewing zone to form the second image visible to the second viewer; and
outputs control signaling for the MV pixels, the control signaling defining color and brightness of each of the beamlets in each bundle to project the corresponding first or second image to the corresponding first or second viewing zone;

(b) for each MV display, opening a market of multiple advertisement lots including first and second advertisement lots on the MV display to prospective advertisers, wherein each advertisement lot is coextensive with an area of the MV display, the first advertisement lot on the MV display is to project the first image based on the first targeted advertising content to the first viewer or the first viewing zone, and the second advertisement lot on the MV display is to project the second image based on the second targeted advertising content to the second viewer or the second viewing zone;

(c) selecting a first advertiser and a second advertiser, from among the prospective advertisers, in the market; and (d) directing the system controller of the MV advertising system to associate the first targeted advertising content that is selected by the first advertiser with the first viewing zone, and to associate the second targeted advertising content that is selected by the second advertiser with the second viewing zone.

21. The computer-implemented method of supporting an MV advertising marketplace according to claim 20, wherein, step (b) includes auctioning the multiple advertisement lots to the prospective advertisers.

22. The computer-implemented method of supporting an MV advertising marketplace according to claim 20, wherein, step (b) includes publishing an advertisement pricing menu to the prospective advertisers, wherein the menu defines prices of the multiple advertisement lots based at least on the first and second attributes.

23. The computer-implemented method of supporting an MV advertising marketplace according to claim 20, wherein, in step (d), the first targeted advertising content is selected based on the first attribute that is selected by the first advertiser, and the second targeted advertising content is selected based on the second attribute that is selected by the second advertiser.

24. The computer-implemented method of supporting an MV advertising marketplace according to claim 23, wherein, in step (d), the first and second attributes are selected by the first and second advertisers prior to the input node receiving the first and second attributes.

25. The computer-implemented method of supporting an MV advertising marketplace according to claim 23, wherein, in step (d), the first and second attributes are selected by the first and second advertisers after the input node receiving the first and second attributes.

26. The computer-implemented method of supporting an MV advertising marketplace according to claim 25, wherein step (b) is performed in real-time responsive to the input node receiving the first and second attributes.

27. The computer-implemented method of supporting an MV advertising marketplace according to claim 20, wherein the multiple advertisement lots on each MV display are defined by one or more of: a location of the MV display, resolution of the MV display, a visibility characteristic of the MV display, timing of advertisement on the MV display, products/services to be advertised, a viewer attribute, an attribute of a group of viewers, a composite attribute that is symbiotically derived from the first and second attributes, a viewing zone attribute, an attribute of a group of viewing zones, advertisers' characteristics, advertisers' preferences, a crowd size/flow related attribute, pricing related attribute, timing attribute, an environmental attribute, a content related attribute, a content scaling/cropping attribute.

28. The computer-implemented method of supporting an MV advertising marketplace according to claim 20, wherein, in step (b), the prospective advertisers are identified based on at least one of: a location of the MV display, resolution of the MV display, a visibility characteristic of the MV display, timing of advertisement on the MV display, products/services to be advertised, a viewer attribute, an attribute of a group of viewers, a composite attribute that is symbiotically derived from the first and second attributes, a viewing zone attribute, an attribute of a group of viewing zones, advertisers' characteristics, advertisers' preferences, a crowd size/flow related attribute, pricing related attribute, timing attribute, and an environmental attribute.

29. The computer-implemented method of supporting an MV advertising marketplace according to claim 20, wherein each of the first and second attributes includes one or more of: a presence of the viewer, a location of the viewer, a characteristic of the location of the viewer, externally-observable characteristics of the viewer, an externally-observable behavior of the viewer, a path of travel followed by the viewer, a speed of the viewer, biometric information of the viewer, demographic information of the viewer, preferences of the viewer, identity of the viewer, information inputted by the viewer, purchase history of the viewer, a location of the viewing zone, an environmental condition of the viewing zone, and a characteristic of the viewing zone.

* * * * *